United States Patent Office 3,551,970
Patented Jan. 5, 1971

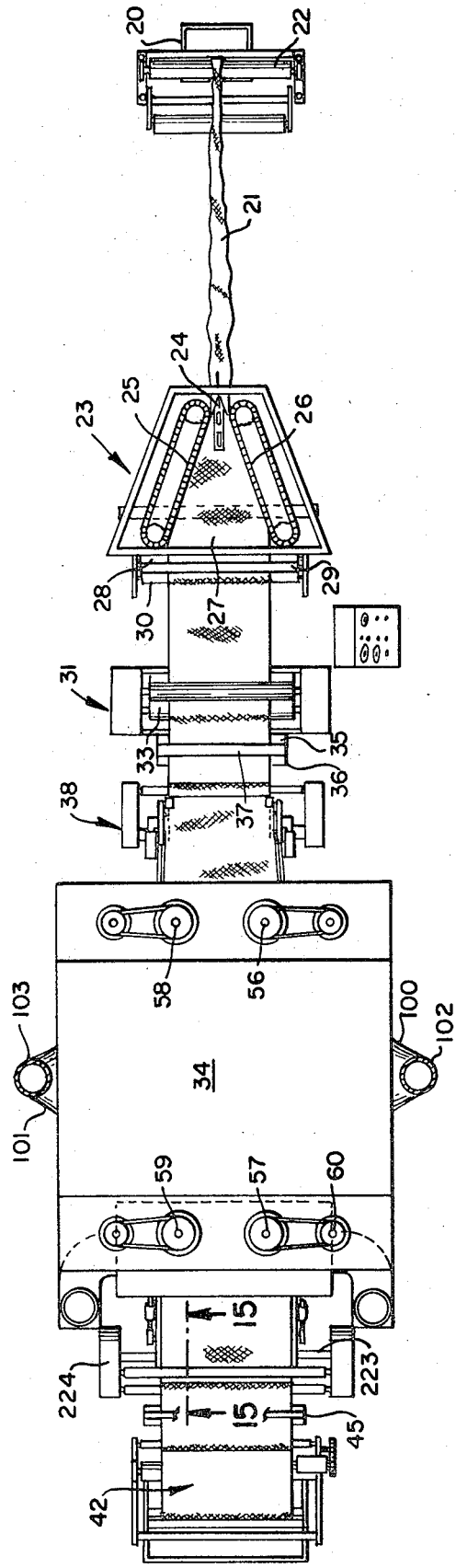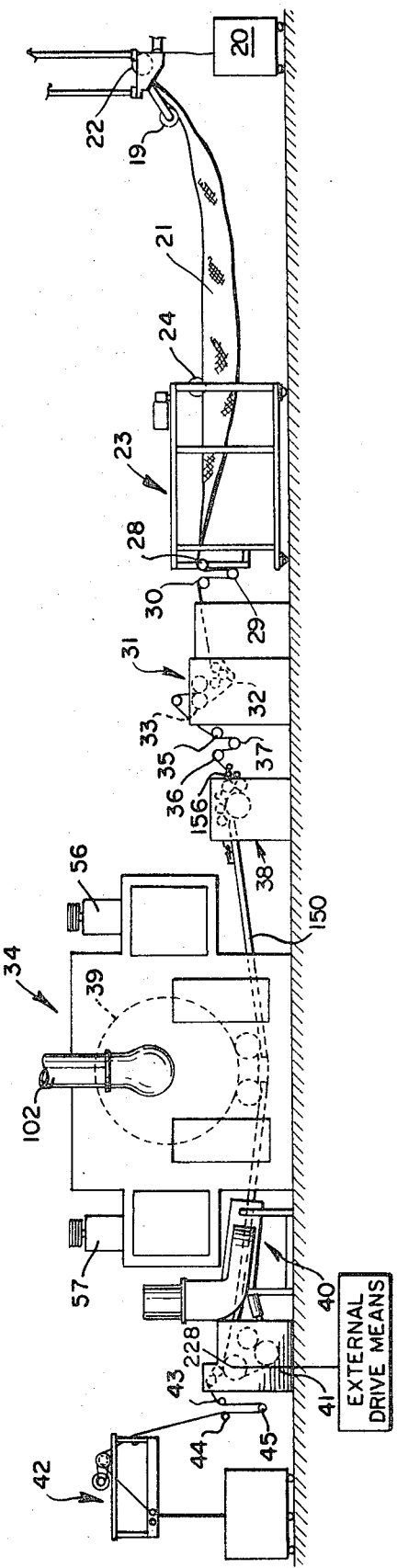

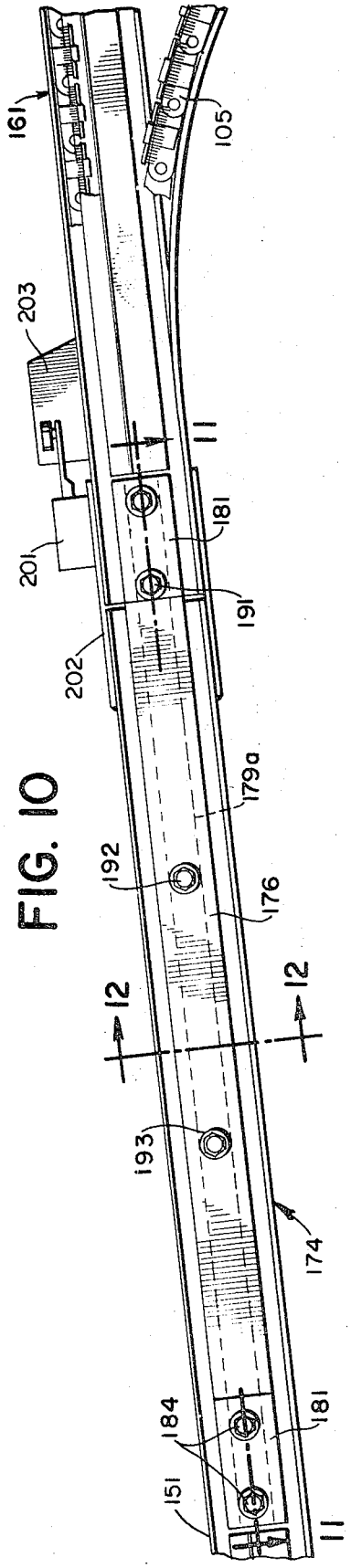
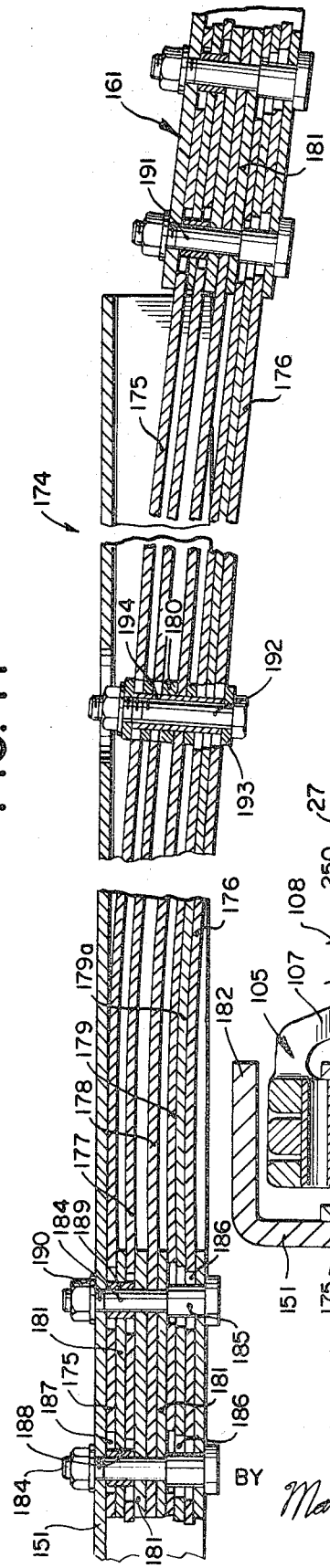
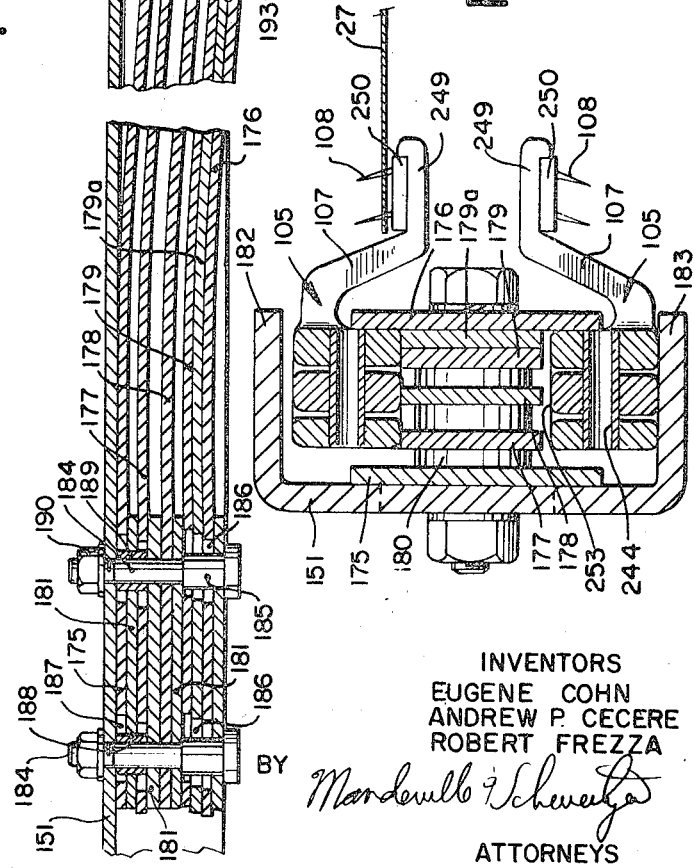
INVENTORS
EUGENE COHN
ANDREW P. CECERE
ROBERT FREZZA
ATTORNEYS

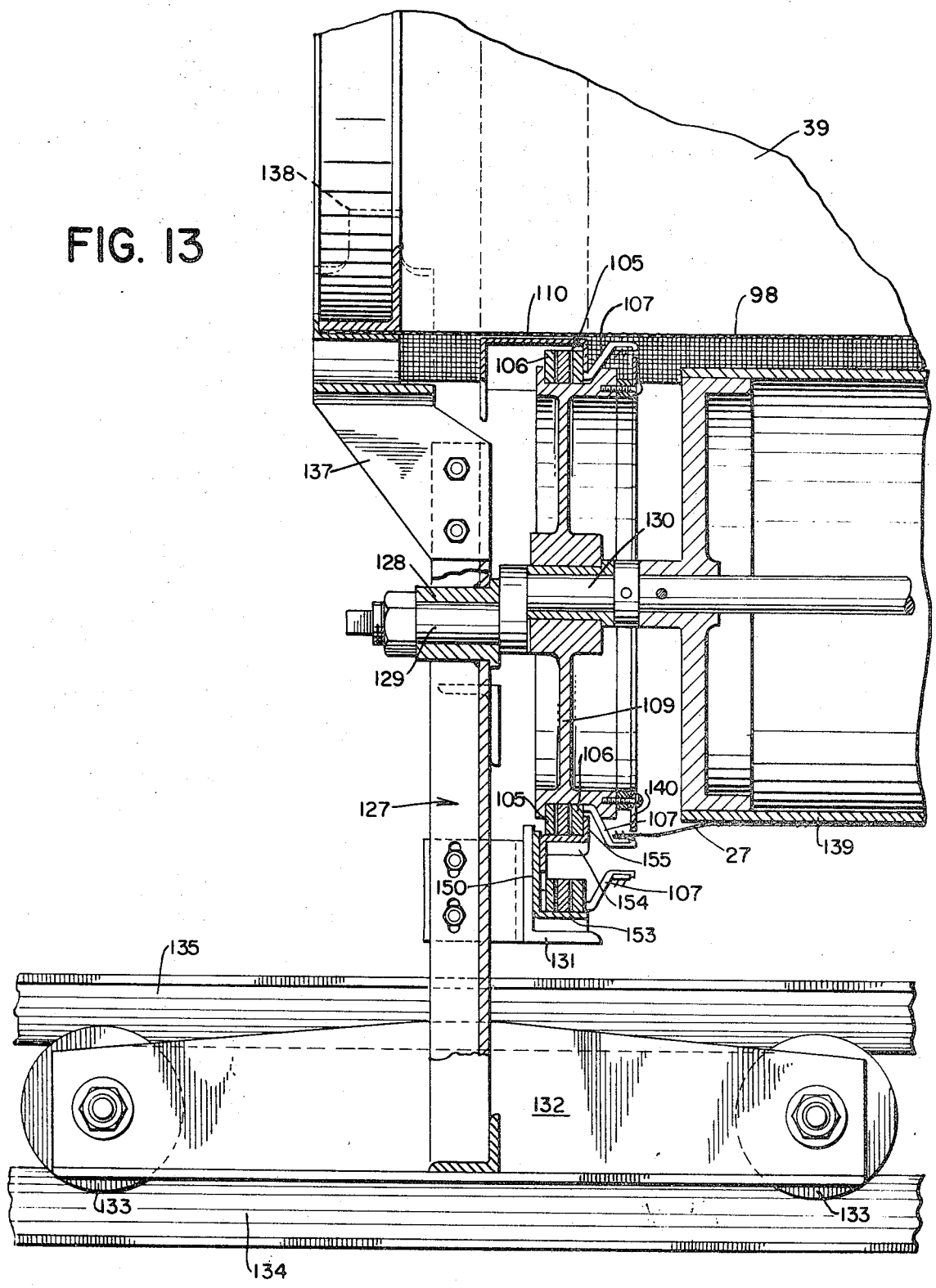

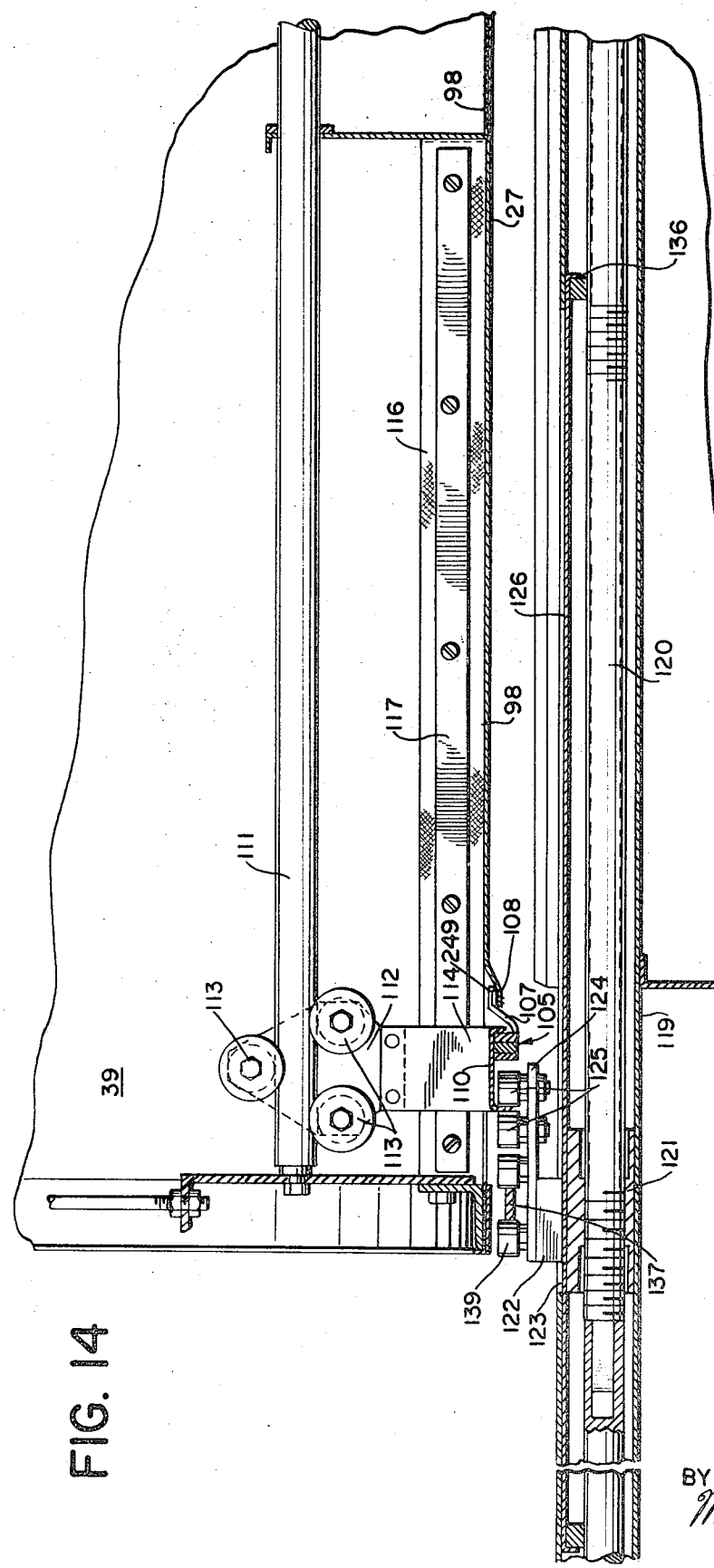

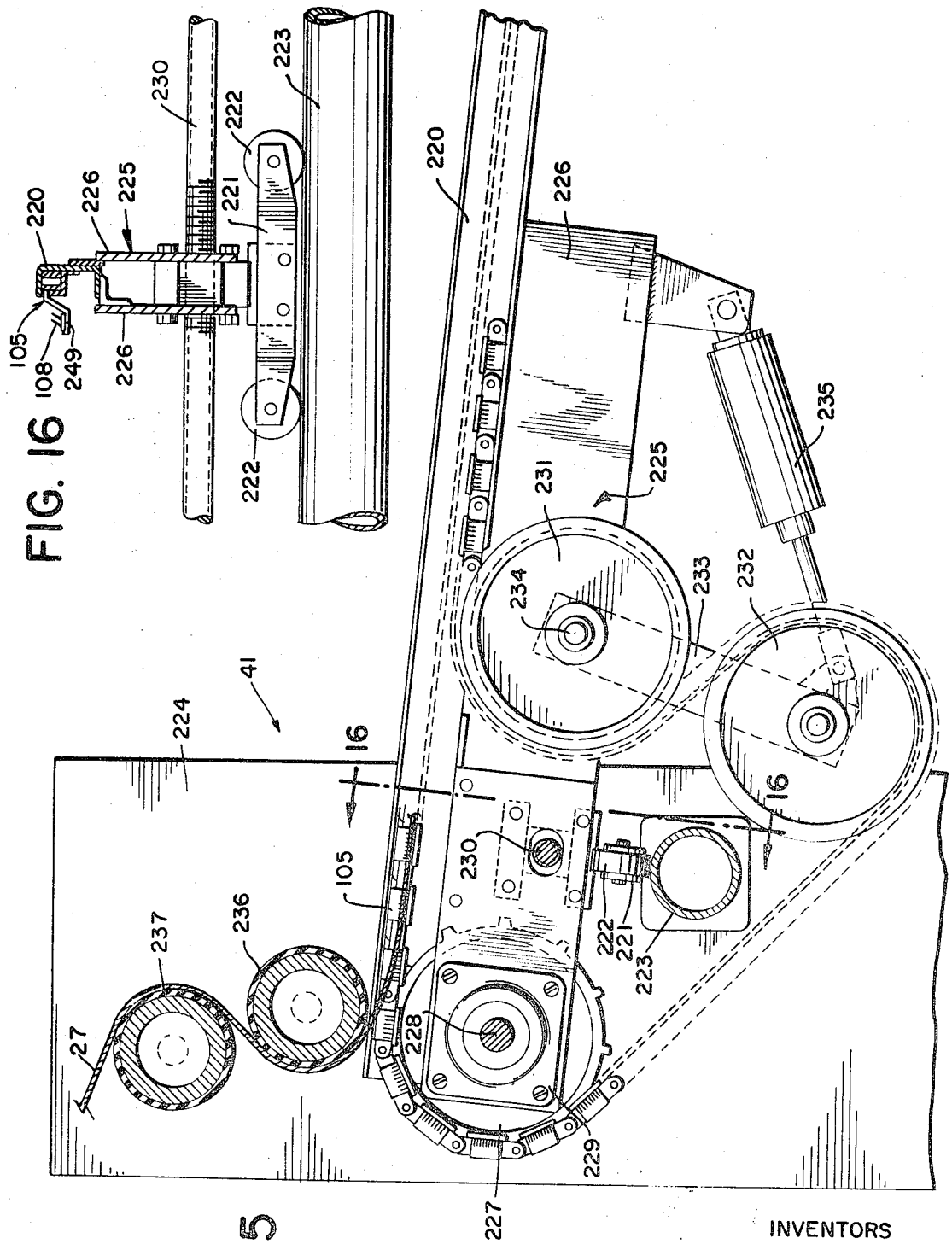

3,551,970
APPARATUS FOR HANDLING AND PROCESSING OPEN WIDTH FABRIC
Eugene Cohn, Great Neck, Andrew P. Cecere, Valley Stream, and Robert Frezza, Carle Place, N.Y., assignors to Samcoe Holding Corporation, Woodside, N.Y., a corporation of New York
Filed Jan. 18, 1968, Ser. No. 698,899
Int. Cl. D06c 3/02
U.S. Cl. 26—59                                21 Claims

ABSTRACT OF THE DISCLOSURE

The invention is directed to method and apparatus for handling and processing fabric webs, and most particularly knitted fabric, in a flat, open width form. The method particularly includes a processing stage, in which the fabric is conveyed about and supported by a rotating drum and dried or heat set, for example, while being maintained under precise width control. Specific aspects of the invention are directed to significant improvements in the construction of rotary dryers and processes for open width fabrics and particularly knitted fabrics, improved tenter means for conveying and controlling open width fabrics during processing, and related features.

RELATED APPLICATIONS

The subject matter of the present application is broadly related to the subject matter of the prior U.S. Pats. Nos. 3,065,551 and 3,102,006, issued to Samuel Cohn, et al., and is usefully employed in conjunction with the subject matter of the Eugene Cohn et al. U.S. application Ser. No. 629,326, filed Apr. 7, 1967, and the subject matter of the Sidney L. Carter et al., U.S. Pat. No. 3,289,510.

BACKGROUND AND PRIOR ART

In the commercial manufacture and processing of knitted fabrics, large quantities of such fabrics are manufactured on circular knitting machines, which initially construct the fabric in tubular form. To a large extent, such circular or tubular knitted fabrics have been handled substantially throughout the entire processing sequence in tubular form, and a variety of processing and handling equipment is available, which accommodates the knitted fabric in its tubular form. To an increasing extent, however, newer types and styles of tubular knitted fabrics, and more demanding end use specifications for such fabrics, are compelling the fabric processor to process knitted fabric in open width form, even though the fabric may have been initially constructed in tubular form. For example, many modern fabrics, when passed through a processing nip or otherwise subjected to pressure while in tubular form, will form an edge crease, particularly when the fabric is in a wet condition. With some fabrics, this creasing is an irreversible process in that the crease mark cannot subsequently be completely removed. Accordingly, it is becoming desirable to an increasing extent to process many knitted fabrics by first slitting and opening the fabric, before it is subjected to any processing steps involving the application of pressure. Thereafter, the fabric is handled and processed in flat, open width form, so that there is no occasion for edge creases to be imparted to the fabric.

In the processing of woven goods, which typically are initially constructed in flat form, it has long been the practice to handle and process such fabrics in open width form. This being the case, there are certain similarities between the open width processing of knitted fabrics and woven fabrics. However, by reason of the unique construction of the knitted fabric by interlocking loops, rather than by interwoven warp yarns extending lengthwise and woof yarns extending widthwise, the knitted fabric has an inherent interdependence of length and width dimensions and an inherent geometric instability. These characteristics of the knitted fabric differ not only in degree but also in kind from the characteristics of woven fabric, such that the equipment and technology long available to the woven goods industry is not easily translatable to the knit goods processing industry, accounting for the fact that open width processing of knitted fabric now is practiced only in limited volume relative to the processing of fabric in tubular form.

The present invention concerns itself most significantly with the processing, as by drying, heat setting, or curing of an open width knitted fabric, and the handling of the fabric immediately prior to and following such processing. However, many principles of the invention are applicable to advantage in the processing of woven fabrics and other web materials and the invention is not necessarily limited to the processing of knitted fabrics. In the new system, a unique rotary drum processor arrangement is provided, which is capable of handling and processing open width knitted fabric and other fabric webs with high efficiency and uniformity. To this end, the processing unit incorporates a number of features of significant novelty which render the apparatus commerically useful and desirable for the specific application of drying, heat setting or otherwise processing open width knitted fabric and other porous web materials and distinguish it significantly from prior art proposals for rotary tenter-type dryers, such as is reflected by the previously issued Parks U.S. Pat. No. 1,963,672, and the Hunter et al. U.S. Pat. No. 2,252,181, for example.

SUMMARY OF INVENTION

In accordance with one aspect of the invention, a novel and improved rotary drum tenter processor is provided, which is specifically suitable for the drying or other processing of open width fabric webs. The dryer of the invention incorporates a large diameter processing drum, of open mesh construction, which is surrounded very closely over much of its circumference by air nozzles arranged to direct closely spaced, discrete streams of air at high velocity radially into the drum and through the fabric supported thereon. The drum has a fixed width, related to the maximum width capacity of the processing line, and has associated therewith a novel and particularly advantageous tenter guide arrangement of adjustable width. The tenter guide includes adjustable tenter chain guides which closely surround the drum while being supported internally of the drum. The guides are engaged at one or more points radially externally of the drum for axial adjusting movement for regulating the width separation of the tenter chains. The arrangement is a simple, reliable, and wholly effective structure for accomplishing width control adjustments without interfering with the critical uniformity of air flow through the fabric. In addition, the tenter width adjustment according to the invention accommodates a rugged construction which can tolerate the severe operating conditions encountered, which typically include being splattered and coated with excess heat-curable resins, for example.

The invention is additionally directed to improved tenter arrangements for engaging the fabric in advance of the processor and directing the fabric edges to set the fabric at a predetermined width and conveying the fabric continuously and uninterruptedly into the processor, around the circumference of the drum and out of the processor stage, all under conditions which maintain the geometric uniformity of the fabric, including cross line straightness. In accordance with one specific aspect of the invention, for example, a pair of spaced tenter chains is driven by imparting driving power to one chain only through a suitable sprocket means. The driven chain serves to drive the rotatable processing drum through the friction of the extended contact as the chain passes around the circumference of the drum. The second tenter chain is driven by its frictional contact with the drum. In this manner, the greatest uniformity of edge advancement of the fabric along opposite sides is assured during the period when the fabric is travelling over the drum. Where appropriate, the drum may be driven directly from the motive source, with both chains being driven synchronously by the drum.

Another specific inventive feature of the tenter chain arrangement resides in the provision of a specifically novel edge-seeking arrangement for the input end of the tenter. Thus, the tenter chain may be adjusted principally for a predetermined width and alignment but the fabric being supplied to the input end of the tenter, particularly with knitted fabrics because of its geometric instability, may not have its edges properly aligned with the principal portions of the tenter. Through suitable controls, which may in themselves be somewhat conventional, the input end extremities of the tenter chains may be manipulated to seek and follow the actual edges of the incoming fabric, so that the fabric edges are properly impaled upon the tenter pins. Of specific inventive significance, the tenter chain itself and the guide channel arrangement therefor is especially constructed to accommodate the lateral flexing necessary for edge-seeking, without unduly stressing the chains and without undesirably affecting the linear relationships between the advancing chain and the advancing fabric.

In the tenter-conveying of a wet knitted fabric, for example, severe distortions of the fabric can result if the fabric is not adequately supported while it remains in a wet condition. To this end, the apparatus of the invention includes an intake tenter section which includes means such as conveyor belts to support fabric as it advances to the dryer housing. Within the housing, the fabric is supported on a "cushion" of low velocity air, as it advances through a preheating zone, toward the main drum. Once on the drum, of course, the fabric is mechanically supported across its full width on one surface, and thus may be acted upon by high velocity air jets for highly efficient drying or processing action.

The invention also includes novel and improved adjustable tach-follower controls for controlled overfeeding of the fabric onto the tenter chains, and controlled removal of the processed fabric. At the entry end, there are provided separately adjustable tach-follower controls for feeding the opposite edges of the fabric onto the tenters, for controlled overfeeding and cross line adjustment. At the discharge end, an adjustable tach-follower control is provided for removal of the fabric from the tenter pins. This enables the fabric speed to be properly readjusted to accommodate geometrical changes in the fabric (typically, slight narrowing and corresponding lengthening of the laterally distended fabric) as it is released by the pins.

The invention is applicable to the processing of fabric in either its wet or dry condition and is particularly useful for drying and/or curing of wet processed, impregnated various knitted fabrics, for example, the heat setting of polyester or nylon fabrics, or other fabric processing operations involving the maintenance of precise geometric stability during processing. In addition, the system of the invention accommodates high speed, efficient commercial-scale operations with a variety of fabrics and processing techniques. The starting material may be in tubular form or not and may or may not be subjected to an in-line preparatory treatment, such as wet-out or chemical impregnation.

For a better understanding of the above and other advantageous features of the invention, reference should be made to the following detailed descriptions and to the accompanying drawing.

DESCRIPTION OF THE DRAWING

FIG. 1 is a simplified top plan view of a processing system, incorporating the invention, for the handling and processing of knitted or other fabric web in open width form.

FIG. 2 is a smiplified elevational view of the system of FIG. 1.

FIG. 10 is an enlarged fragmentary cross-sectional view taken generally along line 10—10 of FIG. 6.

FIGS. 11 and 12 are enlarged fragmentary cross-sectional views taken generally along lines 11—11 and 12—12, respectively, of FIG. 10.

FIGS. 13 and 14 are enlarged fragmentary cross-sectional views taken generally along lines 13—13 and 14—14, respectively, of FIG. 3.

FIG. 15 is an enlarged fragmentary cross-sectional view taken generally along line 15—15 of FIG. 1.

FIG. 16 is an enlarged fragmentary cross-sectional view taken generally along line 16—16 of FIG. 15.

FIG. 17 is an enlarged fragmentary plan view, partly broken away, illustrating construction details of an advantageous form of tenter chain incorporated in the system of FIG. 1.

FIG. 18 is an enlarged fragmentary cross-sectional view taken generally along line 18—18 of FIG. 17.

Figure 3:
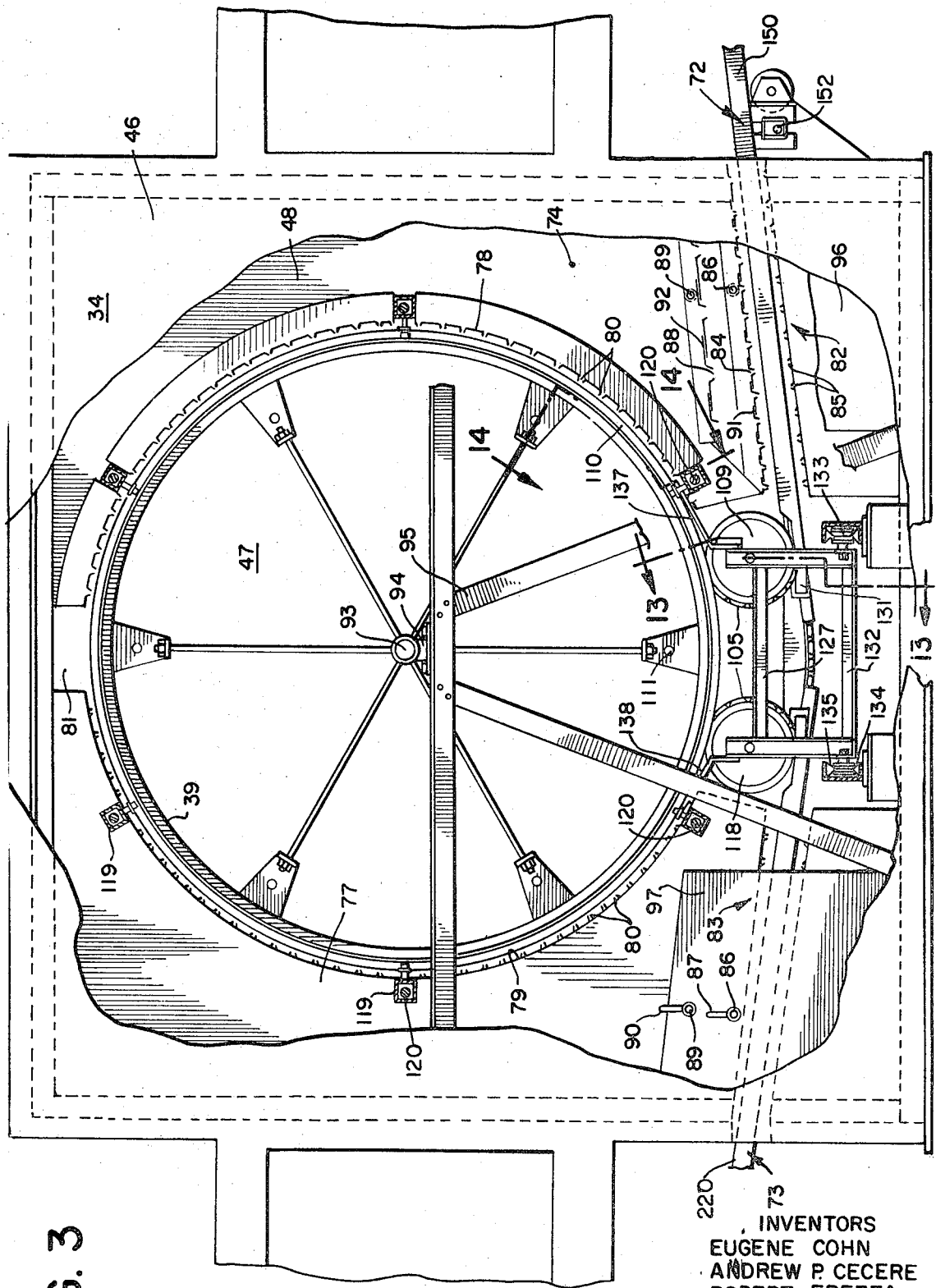
FIG. 3 is an enlarged elevational view, with parts broken away, illustrating details of the construction of the rotary drum tenter dryer apparatus of the invention.

Referring now to the drawing, and initially to FIGS. 1 and 2 thereof, there is illustrated a typical processing line incorporating the features of the invention. At the upstream end of the processing line there is shown a supply container 20 holding a supply of, in the illustrated instance, tubular knitted fabric 21, typically in a wet condition. The fabric 21, in rope form, is drawn out of the supply container, over a roller 22, being de-twisted as necessary by an attendant operator. The fabric 21 then advances into the input of a slitting and opening stage generally designated by the numeral 23.

Most advantageously, the slitting and opening stage 23 is constructed in accordance with the teachings of the Sidney L. Carter et al., Pat. No. 3,289,510, to which reference should be made for further details. In addition, the slitting and opening stage may incorporate improvements described and claimed in the Eugene Cohn et al., U.S. application Ser. No. 629,326.

In general, the slitting and opening stage includes a slitting knife 24, which cuts the advancing tube of knitted fabric, and incorporates a pair of divergently related tenter chains 25, 26, which engage the newly formed edges of the fabric immediately adjacent the slitting knife. The arrangement is such that the edges of the slit fabric are simultaneously advanced and separated, until the fabric is converted from a slit, but otherwise tubular form, to a flat, open width form, substantially as indicated at 27 in FIG. 1. As explained in more detail in the before-mentioned Carter et al. patent and in the Eugene Cohn et al., application Ser. No. 629,326, the described slitting and opening device is particularly advantageous for (although not necessarily limited to) the slitting and opening of tubular knitted fabric in a wet condition. This is desirable because, in a typical situation, the knitted fabric 21, as received from the supply container 20 will be in a still-wet condition from a previous wet-processing operation, such as dyeing, bleaching, etc.

At the discharge end of the slitting and opening stage 23, the now open-width fabric 27 passes over a guide roller 28, under a floating control roller 29 and over a second guide roller 30, and thence proceeeds onto a padding stage, generally designated by the numeral 31. The floating roller 29 serves an advantageous control function by sensing out-of-phase speed relationships between the slitting and opening stage and the subsequent stages. Through appropriate control circuitry not specifically illustrated herein, corrective speed changes are made automatically.

Where desirable or expedient, means such as an air guide arrangement may be provided, directly in advance of the padding stage, for accurately centering the fabric. Edge decurlers may also be provided for laying the fabric edges flat and preventing fold-over of the edges as the fabric enters the pad. Especially advantageous forms of air guiding and de-curling arrangements are shown in the co-pending application of Eugene Cohn et al., Ser. No. 611,609, filed Jan. 25, 1967 and now U.S. Pat. No. 3,494,011 granted Feb. 10, 1970.

The fabric 27 entering the padding stage 31 is directed through a series of pressure-contacting nip rollers 32, which are advantageously submerged in a bath of treating liquid maintained in a suitable retaining tank. The fabric thus is directed through a plurality of submerged pressure nips, which successively squeeze and release the submerged fabric, after which the fabric passes through a pair of extracting rollers 33.

The padding stage advantageously is located directly in advance of the drying stage, designated by the reference numeral 34, and serves to impart to the fabric, in advance of drying, a uniform liquid content, not only edge to edge but along the length of the fabric. In this respect, a wet-processed fabric retained in the supply container 20 may be partly immersed in a residual quantity of the original processing liquid, such that the fabric emerging from the supply container may vary in liquid content from damp to soaking wet. If fabric in this condition were directed through the drying or heat processing stage it would dry (or cure, heat set, etc.) at nonuniform rates, depending upon the initial liquid content of a given area. This could introduce serious geometrical distortions in the fabric and also could cause migration of dyes and treating chemicals in the fabric. In accordance with the invention of our copending application Ser. No. 625,725, the liquid content of a wet-processed fabric is caused to be uniform throughout, by means of processing the fabric in the padding stage 31, so that the subsequent drying or heat processing of the fabric proceeds uniformly.

Fabric discharged from the padding stage 31 advantageously passes over guide rollers 35, 36, and under a floating control roller 37, which serves to maintain proper speed relationships between the heat processing and padding stages. The fabric then advances to a tenter pinning stage, generally designated by the numeral 38, at which the fabric edges are applied over the pins of spaced tenter chains. As will be described in more detail, the tenter pinning stage 38 includes fabric edge-seeking controls for manipulating the input ends of the tenter chains inward and outward, as required, in order that the tenter pins engage the fabric edges along a desired margin. The edge-seeking portions of the tenter chains are manipulated independently of the basic width adjustment of the chains, such that the pinned fabric ultimately is conveyed through the remainder of the process at a uniform, preadjusted width.

At the pinning stage, the fabric is also desirably applied to the tenter pins in such a way as to provide a predetermined amount of "overfeed" of the fabric across its width, to accommodate a reasonable amount of lengthwise shrinkage of the fabric during the subsequent heat processing stage and also to accommodate shortening of the fabric which accompanies its widthwise distension. In connection with the processing of knitted fabric in particular, provision for lengthwise relaxation shrinkage is important, in order that the processed fabric have reasonable geometric stability.

As reflected schematically in FIGS. 1 and 2, the open width fabric, now pinned on the tenter chains, is conveyed into the heat processing stage 34 and, while still on the tenter pins, is carried about a large diameter rotating processing drum 39. While passing about the drum, the fabric is subjected to the action of a series of closely spaced high velocity streams of heated air, which are directed radially inward of the drum 39 from the air ducts closely embracing the circumference thereof.

After leaving the processing drum, the now dried or otherwise processed fabric, still engaged by the tenter chains, is conveyed through a cooling stage, generally designated by the reference number 40, and to a de-pinning stage, generally designated by the numeral 41. Thereafter, the fabric is conveyed to a suitable gathering stage, generally designated by the numeral 42, which typically may be a horizontal plane folder, or may be a wind-up apparatus, as will be understood. Guide rolls 43, 44 and an associated floating control roll 45 advantageously may be interposed between the de-pinning stage 41 and the gathering stage 42, to maintain appropriate speed relationships between these stages.

The drying or processing stage 34, forming one of the particularly important aspects of the present invention, is illustrated particularly in FIGS. 3-5, 13 and 14. The illustrated processing apparatus includes a large, typically rectangular housing 46, which includes a central chamber 47, in which is rotatably supported the large diameter cylindrical processing drum 39. The drum 39 is of fixed axial length, which is slightly greater than the maximum width of the fabric to be accommodated by the system.

The processor housing 46 also includes plenum chambers 48, 49, which closely surround most of the circumference of the drum 39 and extend from one end to the other of the working length of the drum. Beyond the ends of the drum 39, the plenum chambers 48, 49, on each side of the housing, there are provided enlarged end chambers 50, 51. These end chambers provide an open and unrestricted communication with the axial ends of the processing drum 39, to accommodate a free axial flow of air out of the ends of the drum and into the end chambers, generally in accordance with the teachings of the U.S. Pat. No. 3,065,551, of Samuel Cohn et al.

Figure 5:
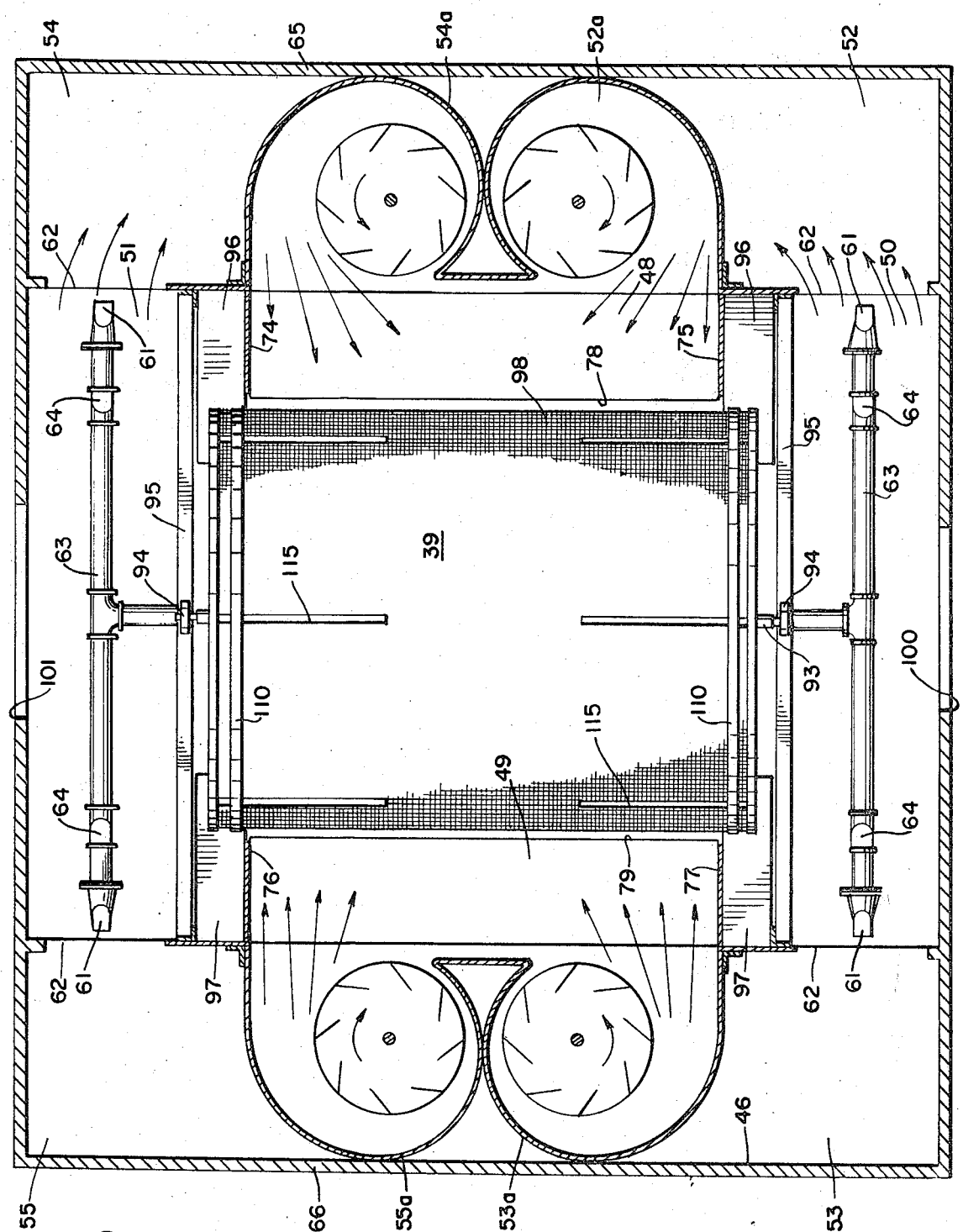
FIG. 5 is a cross-sectional view taken generally along line 5—5 of FIG. 4.

At each end of the dryer housing 46, the end chambers 50, 51 are in communication with blower intake chambers 52, 53 (for the end chamber 50) and 54, 55 (for the end chamber 51). Each of the intake chambers 52–55 is associated with adjacent blower outlet chambers 52a–55a. As shown in FIG. 5, the blower outlet chambers 52a, 54a discharge into opposite sides of the plenum chamber 48, while the blower outlet chambers 53a–55a discharge into opposite sides of the plenum chamber 49. The arrangement is such that air from the respective end chambers 50, 51 is divided and flows in opposite directions into the blower intake chambers 52, 53 and 54, 55. This air flows through blowers 56–59 (see (FIG. 1) driven by suitable motors 60, such that the air is directed under pressure into the plenum chambers 48, 49, where air from opposite end chambers 50, 51 is recombined.

Advantageously, air entering the several blower intake chambers 52–55, is heated by means of gas burners 61 (see FIG. 4) disposed adjacent the intake openings 62 to each of the blower intake chambers. Typically, the gas burners 61 may be supplied through distribution pipes 63 connected to vertical pipes 64 extending from the floor of the dryer housing 46 up to the burners 61. As illustrated particularly in FIG. 4, the blower intake and blower outlet chambers 52–55 and 52a–55a, typically may be of substantially smaller dimensions than those of the end chambers 50, 51, for example. Thus, the blower intake and outlet chambers may extend from the forward and rearward walls 65, 66 of the processor housing substantially at the level of the axis to the drum 39. These chambers, while extending from one side to the other of the housing, may be approximately one-half the height of the housing, so that the upper and lower walls 67, 68 of these chambers are disposed well below and well above the top and bottom walls 69, 70 of the processor housing. As reflected in FIG. 4, the blower units 56–59 and the drive motors 60 therefore advantageously are mounted on the top walls 67 of the blower chambers, so as not to extend appreciably above the top walls 69 of the main housing. The bottom walls 68 of the blower chambers are spaced well above the floor level 71, on which the unit is supported, to accommodate the extension of incoming and outgoing tenter chain sections 72, 73.

As indicated best in FIGS. 3 and 5, air discharged under pressure from the blower outlet chambers 52a–55a, enters the plenum chambers 48, 49, which are comprised of arcuate, approximately semi-circular air ducts. These ducts include end walls 74, 75 on one side and 76, 77 on the other side of the processing drum. In addition, each plenum chamber includes an arcuate, approximately semi-circular wall 78 or 79 which closes in the chamber and is concentric and closely spaced from the outer wall of the processing drum 39. By way of example, in an apparatus in which the processing drum is about seven feet in diameter, the spacing between the arcuate duct walls 78, 79 and the outer wall of the drum 39 advantageously is on the order of, say, one and one-half to two inches.

About the entire surface of the arcuate duct walls 78, 79, there are provided air nozzles 80, which advantageously extend transversely entirely across the plenum chambers 48, 49. As illustrated in FIG. 3, these transversely disposed air nozzles 80 may be spaced a few (e.g., three to four) inches apart over the entire area of the arcuate duct walls 78, 79, and may have a nozzle width of about one-quarter to one-half inch. The arrangement is such that, when air under pressure is supplied to the chambers 48, 49, a large plurality of narrow, discrete air streams, each extending entirely across the width of the plenum chambers are directed out of the nozzles 80, in a radially inward direction with respect to the processing drum 39. As will be described, the cylindrical outer wall of the drum is constructed of a perforate material, such as a wire screen or mesh, such that the air streams issued from the nozzles 80 are directed toward and through the outer wall of the drum and through any fabric supported thereon.

Most advantageously, the pressure relationships existing within the housing 46, are such that the discrete air streams being issued from the nozzles 80 are of relatively high velocity (e.g., on the order of 2,500 to 4,000 ft. per minute) such that each of the air streams issuing from the large plurality nozzles 80 is relatively distinct, and a given area of fabric, being conveyed through the processor on the surface of the drum 39, is alternately and repeatedly subjected to the action of separate and distinct high velocity air streams. As described in connection with the before-mentioned Samuel Cohn et al., U.S. Pat. No. 3,102,-006, this air flow pattern, in conjunction with a predetermined overfeeding of the fabric into the processor in the first instance, enables a particularly efficient drying or heat processing action to be realized, accompanied by repeated manipulation and working in the fabric to promote relaxation shrinkage in the lengthwise direction.

Figure 4:
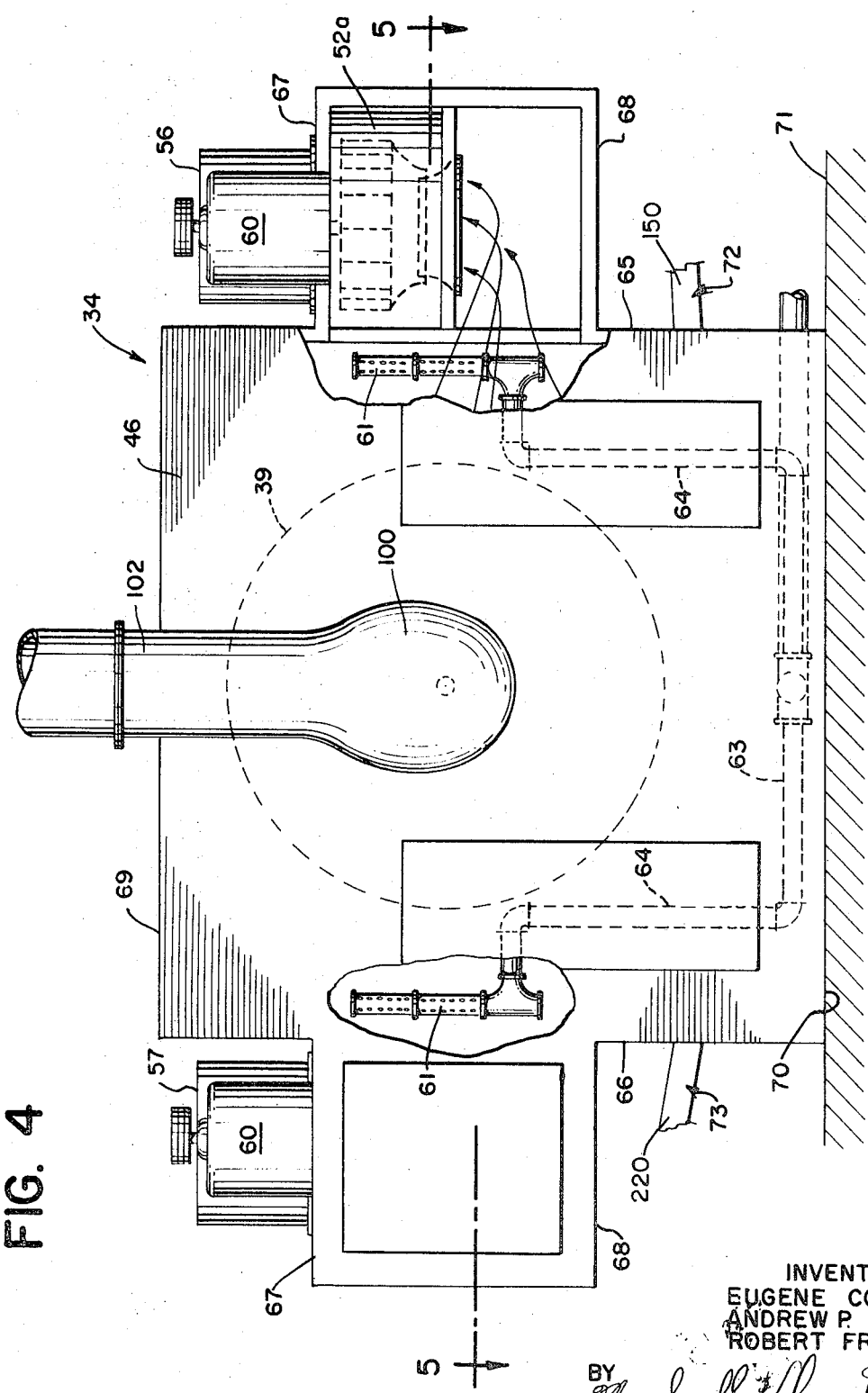
FIG. 4 is an elevational view of the apparatus of the invention, illustrating details of the arrangements for the heating and flow of drying air.

As shown in FIG. 4, the plenum chambers 48, 49 advantageously terminate in the upper portion of the processor housing 46, in sligthly spaced relation to each other. This provides a transverse passage 81 at the top of the housing for the flow of excess air out into the end chambers 50, 51. The plenum chambers also terminate in spaced relation in the lower portion of the housing, to accommodate the handling of the incoming and outgoing fabric, as will be explained in more detail. Overall, each of the arcuate walls 78, 79 of the plenum chambers 48, 49, may embrace approximately 150°–160° of the surface of the drum 39, so that a maximum area of the drum is exposed to the action of the processing air.

On the incoming and outgoing sides of the processor housing, there are provided pre-heating and post-heating chambers 82, 83. These advantageously are located in the lower portions of the housing, so as to be positioned adjacent lower quadrants of the central chamber 47. The chambers 82, 83 consist of a series of upper and lower air nozzles 84, 85, which are positioned, respectively, above and below the plane of the incoming open width fabric, being conveyed in on the incoming and outgoing tenter chain sections 72, 73. Closely spaced, discrete, low velocity streams act upon the upper and lower surfaces of the fabric, as it enters the housing 46, and throughout a zone of several feet in length, prior to advancement of the fabric onto the surface of the processing drum.

Advantageously, the air nozzles 84, in the pre-heating and post-heating chambers, are adjustable in opening size relative to the lower nozzles 85, as by means of an adjusting shaft 86, rotatable by a lever 87. The arrangement is such that, air under pressure supplied to the pre-heating and post-heating chambers is controllably directed through the upper and lower air nozzles 84, 85, in a manner such as to provide a net upward pressure of air flowing from the lower nozzles 85. This is particularly significant in connection with the pre-heating chamber 82, because the fabric entering and passing through the pre-heating chamber, engaged at its opposite edges by tenter chains, is wet and heavy and tends to sag between the supported edges. The net upward force of the air streams in the pre-heating chamber provides an advantageous support for the center area fabric to avoid sagging and distortion of the fabric. If desired or expedient, the upper nozzles 84 may, in some cases, be closed off entirely.

Air is supplied to the upper nozzles of the pre-heating and post-heating chambers 82, 83, by means of openings 88, which connect the lower portion of the plenum chambers 48, 49, with the respective pre-heating and post-heating chambers. The size of the openings may be adjustable, as through a shaft 89 and lever 90, to provide for proper apportionment of flow in the various chambers. The air is supplied under a pressure suitable to achieve a relatively low velocity flow at the nozzles. A velocity on the order of 600 feet per minute is typical and advantageous. In the illustrated apparatus, the adjustable openings 84, 88 are formed by slidable nozzle sections 91, 92, which are controllably positioned relative to opposed, fixed nozzle sections through the control levers 87, 90. For some installations, however, it may be adequate to set the size of the openings 84, 88 at the factory and eliminate adjustment features.

The processing drum assembly 39 includes a shaft 93, journaled in bearing blocks 94, supported by structural frames 95. The frames are positioned within the end chambers 50, 51, and are spaced somewhat beyond the end walls 74–77 of the air duct means forming the plenum chambers 48, 49. The outward spacing of the frames 95 is such as to accommodate the presence, outside of the duct walls 74–77, of ducts 96, 97, which connect the upper and lower portions of the pre-heating and post-heating chambers 82, 83.

The drum shaft 93 supports an open, skeleton framework, on which is supported a cylindrical outer wall 98 of perforate form. This wall most advantageously is made of a stainless steel wire mesh, for example, which may in turn have its exterior surface covered by a mesh of a friction-free material such as an open mesh of fiberglass yarns coated with a material such as polytetrafluoroethylene (e.g., Teflon PTFE). The mesh of friction-free material typically may have openings on the order of one-quarter inch, while the openings of the underlying mesh may be somewhat larger, say, one-half inch.

As reflected in FIG. 3, particularly, the interior of the drum 39 is substantially open, as is the end area of the drum. The arrangement is such that, in the operation of the dryer, a large plurality of discrete streams of processing air, extending across the full operative width of the processing drum, are directed radially into the interior of the drum, through the perforate outer wall 98, and, of course, through any fabric supported thereon. The relatively unobstructed interior of the drum permits a free axial flow of air out of the interior of the drum, from both ends. The highly enlarged end chambers 50, 51 accommodate this axial air flow without causing significant localized flow streams of withdrawn air in and about the processing drum, such as would result in non-uniformity of drying across the width of the fabric. In this respect, it is particularly significiant that the fabric be dried or otherwise processed at a uniform rate across its width as well as along its length, not only to achieve uniform geometric stabilization, but, more importantly, to achieve uniform curing or reaction of fabric components or fabric impregnants, such as dyes, resins, etc. For example, non-uniform drying of a fabric, still wet from the dyeing process, can cause migration of the dye from one area to another of the fabric, resulting in a product which is mottled or otherwise of non-uniform appearance. Likewise, in heat setting of a polyester or nylon fabric, for example, processing uniformity, as well as positive geometrical stability, is critical, because the fabric will assume certain relatively permanent characteristics during the processing stage.

When the processor is in operation, most of the air withdrawn from the ends of the drum is heated by the burners 61, recirculated through the blowers, directed into the plenum chambers 48, 49, and again discharged through the nozzles 80. However, some precentage (e.g., 10%) of the air is continually exhausted to the atmosphere and a corresponding amount of fresh air is, of course, introduced into the system. In the illustrated system, the exhaust air is most advantageously removed by extraction from the end chambers 50, 51, through large exhaust openings 100, 101, located in the outer walls thereof generally opposite the end openings of the drum. The exhaust openings communicate with large exhaust ducts 102, 103 (FIG. 1) through which the air is discharged to the atmosphere. Make-up air, to compensate for the volume of air exhausted, typically is brought into the system through inlet openings, not specifically shown, which desirably are located so that the make-up air is acted upon by the heaters before initially reaching the intakes of the blowers 56–59.

As will be described in more detail, fabric entering the processing stage 34 is pinned upon spaced tenter chains 105, having an advantageous configuration as shown in FIG. 13, for example. The chains are comprised of link bodies 106 and integral offset extension arms 107, which mount appropriate tenter elements, such as plates of tenter pins 108, tenter clips (not shown) or the like.

As the tenter chains advance through the incoming stage into the interior of the processing stage, the chains are transferred to guide sheaves 109, which reverse the direction of the tenter chains and then transfer them to a pair of spaced guide channels 110, disposed about the entire circumference of the processing drum 39. When transferred to the guide chanels 110, the tenter chains 105 are guided and supported by the inner walls of the channels, such that the offset extension arms 107 and the pin plates closely overlie the surface of the outer wall 98 of the drum. This enables a fabric, engaged by opposed tenter chains, to be supported directly upon the surface of the processing drum, in the manner desired, closely adjacent the edge extremities.

As shown particularly in FIGS. 3 and 14, the pair of guide channels 110 is supported from within the processing drum 39 by means of a plurality (e.g., six in a typical installation) of axially disposed supporting rods 111, secured to the frame structure of the drum. Each of the supporting rods 111 guides a carrier bracket 112 having triangularly arranged trolley wheels 113 engaging opposite sides of the rod. A connecting arm 114 extends radially from the carrier bracket 112 and engages the guide channel 110 just outside the surface of the drum wall 98.

In the illustrated arrangement, each of the guide channels 110 is supported at six points by a structure as described above and illustrated in FIG. 14. The arrangement is such that the guide channels are firmly supported, just slightly spaced outward of the cylindrical outer wall of the processing drum, in a manner to provide for inward and outward axial adjusting movement.

To accommodate the desired axial adjusting movement of the guide channels 110, the end areas of the drum wall 98 are provided with axial slots 115 (see FIG. 5) extending from the outer end of the drum inward for a distance sufficient to accommodate the desired range of adjustment. Typically, in the region of the slots 115, the screen material forming the outer wall of the drum is cut and bent inward, as indicated at 116 in FIG. 14, and secured as by clamping with a strip 117 bolted through the screen to a supporting structure, such as an angle iron (not shown).

As shown in FIG. 3, the tenter chains 105, after traveling in the guide channels 110 with the rotating drum 39, throughout an arc of as much as, say, 330°, are transferred to reversing sheaves 118, and then directed into the outgoing tenter stage, as will be further described.

For effecting inward and outward lateral adjustment of the tenter chains 105, within the processing stage 34, an advantageous arrangement is provided for effecting axial adjustment of the position of the guide channels 110, the reversing sheaves 109, 118, and other elements of the tenter stages. To this end, there are disposed within the processor housing, radially outward of the drum 39, and advantageously just within the physical outline of the hot air ducts 48, 49, a plurality of guide tubes 119 (see FIGS. 3, 14) which typically extend for the full width of the drum 39 and house threaded adjusting shafts 120. Each of the guide tubes 119 receives a slide block 121, which is threadedly engaged by the shaft 120 and has a tongue 122 projecting through a narrow, elongated slot 123 in the guide tube, in a direction radially inward of the processing drum 30, but terminating short of the outer surface thereof. An extension 124 of the tongue mounts a pair of closely spaced guide wheels 125, which closely embrace the opposite surfaces of the radially outwardly extending outer flange of the guide channel 110. The arrangement is such that, as the drum 39 rotates along with the guide channels 110, the outer flange of each of the guide channels is guided and positioned by the pairs of guide rollers 125, at a plurality of point about the circumference of the drum.

As will be understood, the postioning of the pairs of guide rollers 125, for each of the several adjustment assemblies, is coordinated, and the adjustment thereof axially of the drum 39 is synchronized through synchronous manipulation of the several threaded shafts 120. Accordingly, through suitable controls, typically motor driven, the shafts 120 may be controllably actuated, as necessary, to move the guide channels axially inward or outward. In typical operation, the drum is being rotated during an adjusting movement, so that there is relative movement between the guide channels 110 and the guide rollers 125, which further assures smooth adjustment.

Advantageously, an elongated cover plate 126 is supported by the slide block 121 and by supporting blocks 136, within the guide tube 119, to close off the slot 123 while permitting the tongue 122 to project therethrough. This arrangement is particularly advantageous because it prevents accumulations of lint, splatterings of resins and other chemicals from forming around the threaded shaft 120, ultimately to interfere with its proper operation.

Similarly, the supporting arrangement for the guide channels 110 is such as to remain substantially maintenance free in a severe environment. Thus, lint accumulations in the area of the carrier bracket 112 are effectively prevented by the active air flows, during normal operation, and the provision of large diameter, grooved trolley wheels, for cooperation with a cylindrical supporting bar keeps the carrier assembly relatively insensitive to an occasional splattering of chemicals, such as resins.

As will be understood, in effecting an axially inward or outward axial adjustment of the guide channels 110 and the tenter chains supported therein, it is also necessary to effect a like adjustment of the reversing sheaves 109, and also other portions of the tenter line. To this end, the sheaves 109, 118, as well as the adjacent ends of the incoming and outgoing tenter stages, are supported by a carriage frame 127 at each side. As shown best in FIG. 13, the carriage frames 127 include bearings 128 supporting shafts 129, upon which are supported the reversing sheaves 109, 118. For purposes to be explained, the shafts 129 advantageously are of eccentric form, in that the portion 130 thereof, which supports the reversing sheave, is offset from the portion received in the bearing 128. This enables the axis of the reversing sheave to be adjusted relative to the carriage 127, although this is intended to be an installation adjustment and is not needed in day-to-day operations.

The adjacent ends of the incoming and outgoing tenter sections 72, 73, are supported below the reversing sheaves 109, 118 by suitable brackets 131 secured to the carriage frame and movable therewith.

At each side, the entire carriage frame 127 is supported on a trolley structure comprised of base members 132 and pairs of grooved trolley wheels 133. The trolley wheels 133 are supported between opposed pairs of tracks 134, 135, which typically may be formed of the outside corner areas of angle sections.

The carriage rails 134, 135 extend widthwise below the processing drum 39, accommodating inward and outward movement of the sheaves 109, 118 along with the inner ends of the tenter sections 72, 73. As shown in FIGS. 3 and 13, and also in FIG. 14, the carriages 132 are provided with positioning arms 137, 138, which extend upward and outward to be engaged by elements 139 (FIG. 14) carried by the slide blocks 121 of the two lowermost adjusting shafts 120. Thus, when the several adjusting shafts are actuated, to shift the guide channels 110 symmetrically inward or outward relative to the drum, the carriages 132 are simultaneously shifted inward or outward to adjust the inner ends of the tenter sections 72, 73, and the reversing sheaves 109, 118.

In the illustrated form of the invention, fabric supporting drums 139 (FIG. 13) extend transversely between opposed pairs of the reversing sheaves 109, 118. The diameter of the supporting drums 139 approximates that of the tenter chain passing around the reversing sheaves, such that the tenter-engaged fabric is supported in its central portions as it is conveyed through a reversing turn. In the illustrated arrangement, the fabric supporting drums 139 are arranged for telescopic interaction, so as to expand and contract with widthwise adjustment of the tenter chains. Alternatively, the axial length of the supporting drums 139 may correspond to the minimum width setting of the tenter chains and be of fixed length. In the alternative arrangement, portions of the fabric near the edge margins would be unsupported, but this does not appear to present problems of consequence, as long as the fixed length of the supporting drums 139 bears a reasonable relation to the overall width of the fabric. In this respect, a fabric supporting drum 139 having an axial length approximately half of the overall fabric width is entirely satisfactory.

As is illustrated particularly in FIG. 13, the tenter pins 108, engaging the fabric as it passes around the reversing sheaves 109, 118, extend in a generally radially inward direction, while the tenter chain is passing about the sheaves. Accordingly, longitudinal tensions in the fabric will have an inherent tendency to "de-pin" the fabric from the tenter chain. To prevent this, the apparatus of the invention advantageously incorporates a retaining ring 140 associated with each of the reversing sheaves. The retaining ring 140 is secured to the inner side of the sheave and extends radially outward to a point axially inside of and radially outward of the extremities of the tenter pins. The arrangement is such that the pinned fabric, which is passing about the reversing sheaves, is required to pass about the outer extremities of the retaining rings 140. Thus, tensions which are applied to the fabric will simply cause the fabric to be pulled more tightly over the retaining rings 140 and so to be pulled more tightly down onto the tenter pins.

As previously mentioned, the reversing sheaves 109, 118 advantageously are supported by eccentric shafts 129, such that the sheaves can be raised and lowered by rotary manipulation of their supporting shafts. This not only enables the sheaves to be readily adjusted relative to the surface of the dryer drum 39, but also enables the sheaves to be raised to a position high enough to contact and actually support the weight of the drum 39. Through this facility, construction and installation procedures of the bulky and cumbersome dryer drum are greatly simplified. Thus, at the installation site, temporary carriage tracks (not shown) may be installed outside of the dryer housing, in line with the carriage tracks 134. The dryer drum, handle entirely outside the dryer housing, may then be positioned on and supported by the reversing sheaves previously adjusted to elevated positions. The carriages 132 may then be rolled into the interior of the housing, through a still open side wall, and the drum thereafter supported in its regular journals 94. Once this initial installation is completed, the reversing sheaves may be lowered away from the drum, to their desired operating positions. The temporary carriage tracks may, of course, be taken up after the drum is in place within the housing.

The input section 72 of the tenter, shown particularly in FIGS. 3 and 6–13, inclusive, is comprised of a pair of tenter guide channels 150, 151 supported at their inner end extremities by the carriage 132 and at one or more intermediate locations by one or more adjusting shafts 152. The adjusting shafts 152 are of a character similar to the shafts 120 and are controlled to be operated in synchronism therewith, such that the tenter frames 150, 151 are adjusted laterally inward and outward along with the tenter guide channels 110 of the dryer drum, in accordance with fabric width settings. As illusarated in FIG. 13, the tenter channels 150, 151 may comprise an assembly of an L-shaped section 153, for supporting the empty or return reach of the chain, and a Z-shaped section 154 slidably supporting the active or fabric carrying reach of the chain. The channel section 154 has an upwardly extending inner flange 155, which is received between the chain body and the offset arm 107. In normal operation, the chain body slides against the outer face of the flange 155, by reason of the slight widthwise fabric tensions, which tend to draw the tenter chains inwardly.

Figure 6:
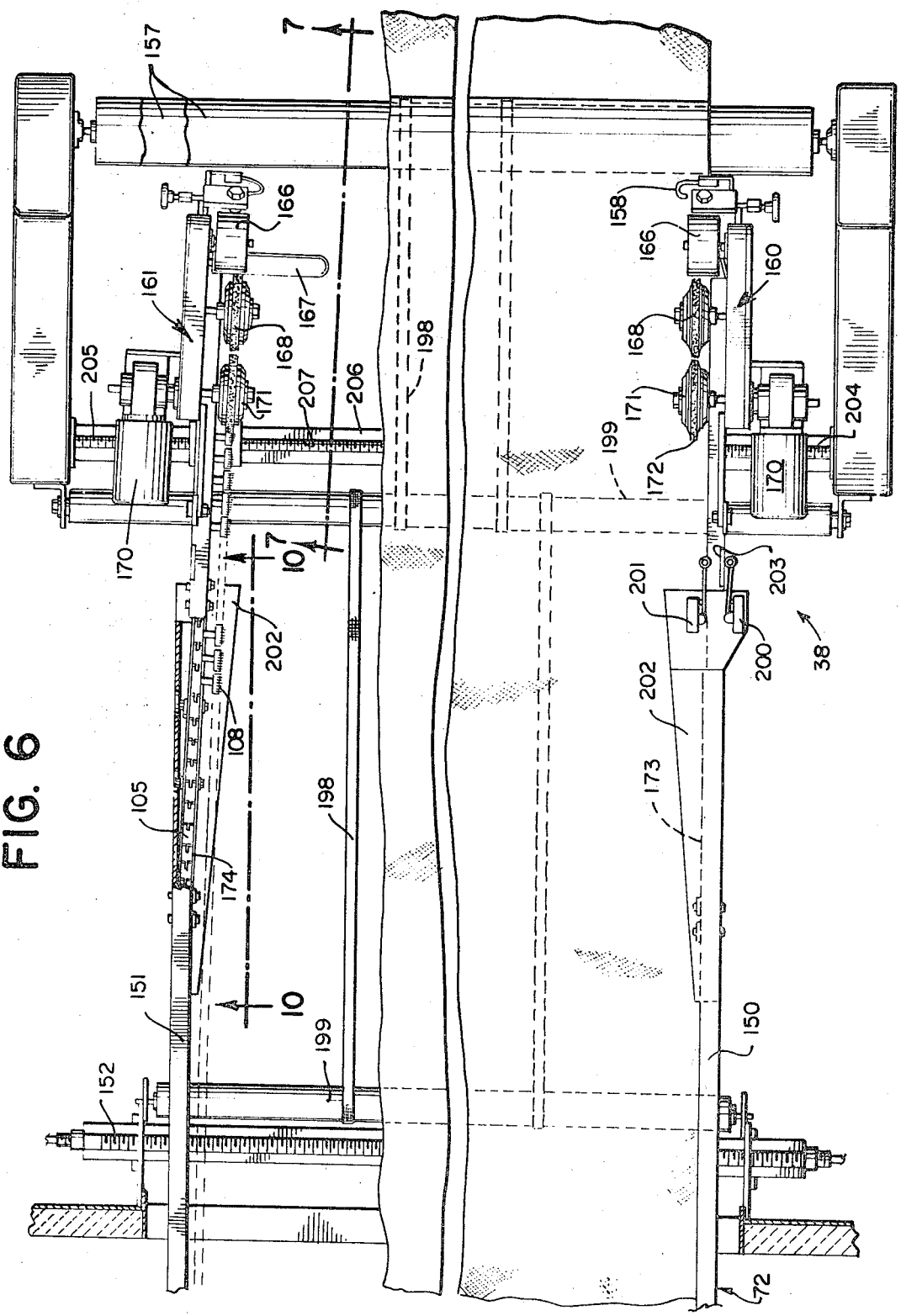
FIG. 6 is an enlarged fragmentary plan view showing the edge-seeking input end section of the tenter frame utilized in the system of FIG. 1.
Figure 7:
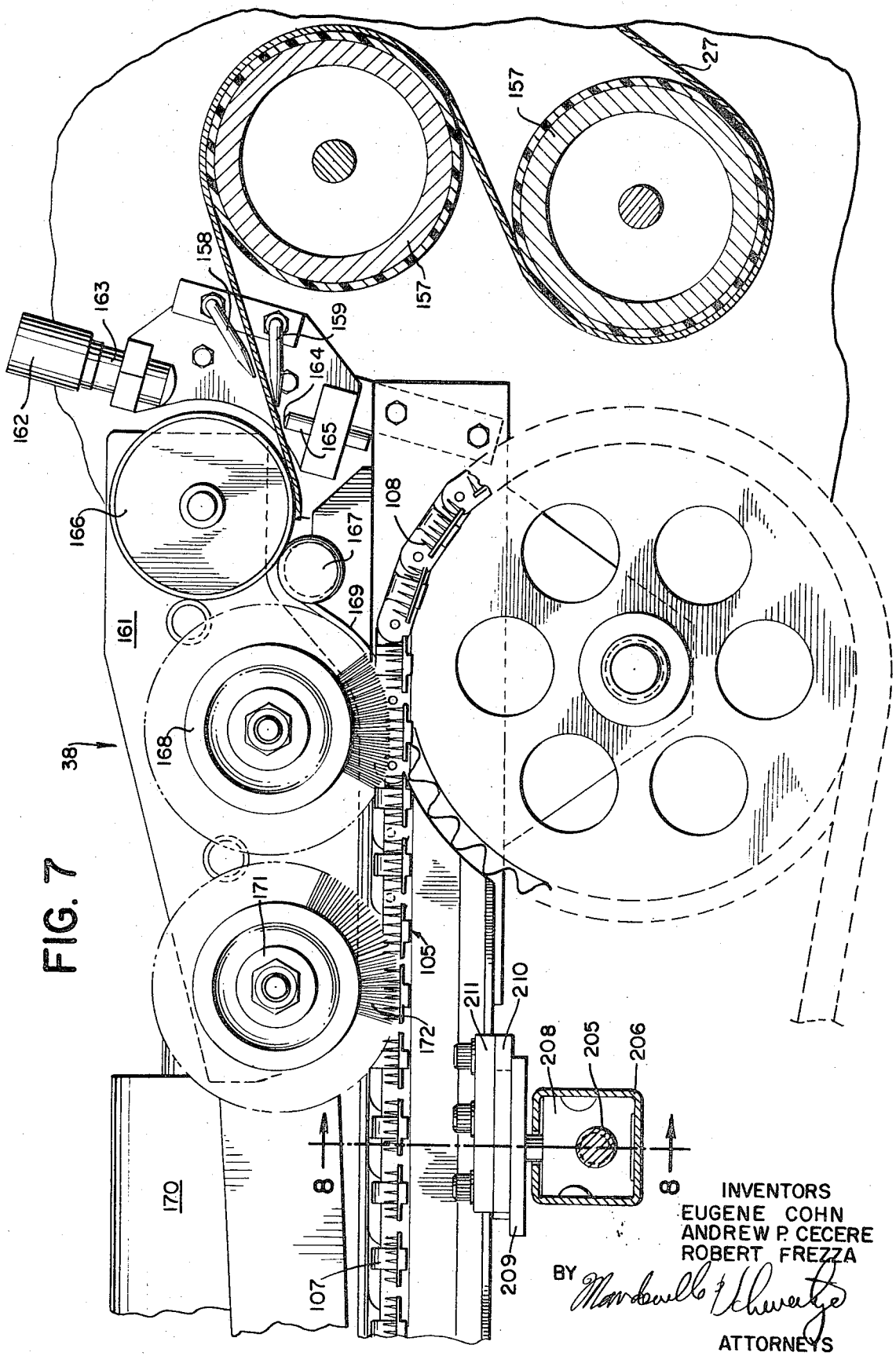
FIG. 7 is an enlarged fragmentary cross-sectional view taken generally along line 7—7 of FIG. 6.

In accordance with one of the specific features of the invention, the input tenter section 72 is provided with a novel and advantageous arrangement for seeking out the edge extremity of the incoming fabric and pinning the fabric properly upon the tenter chains 105. Thereafter, the chains advance into the guide channels 150, 151, to be conveyed through the remainder of the system at a predetermined uniform width dimension. Referring now to FIGS. 6 and 7, the fabric 27, received from the padding stage 31, passes through a set of triangularly configurated, spiral de-curing rollers 156 which are rotated so that the spiral surfaces thereof tend to smooth out and de-curl the fabric. The fabric then is directed through reverse bends about a pair of speed-controlled overfeed rollers 157, which are driven in a predetermined speed relationship to the tenter chains, advantageously at a somewhat higher rate of speed to provide for a desired degree of overfeeding of the fabric onto the tenter pins. Desirably, the overfeed rollers 157 are separated, so as not to nip the fabric, but are provided with suitable friction surfacing which, by reason of the considerable area of contact with the fabric, affords an adequate grip for controlling the fabric in an effective manner.

Fabric discharged from the upper gripping roller 157 passes between pairs of air jet uncurlers 158, 159 carried by edge-seeking tenter sections generally designated by the numerals 160, 161, which are connected to and form the entry ends of the respective tenter channels 150, 151. The edge uncurlers 158, 159 are arranged to direct jets of air outwardly across the top and bottom surfaces of the fabric, to at least momentarily flatten the fabric. In this respect, it will be understood that many slit and opened tubular knitted fabrics, for example, have a pronounced tendency to curl at the edges, particularly when subjected to any lengthwise tension during processing, and it is often necessary to de-curl the fabric at one or more stages for effective handling.

While the fabric edges are held flat by the uncurling jets 158, 159, the fabric passes between an edge sensing control 162, typically consisting of means such as a light source 163 and a pair of photoelectric cells 164, 165. The sensing controls are provided at both sides of the equipment, of course, to detect the opposite edges of the fabric. The arrangement of the control is such that, if neither of the photoelectric cells is covered by the fabric edge, the edge-following section of the tenter chain will automatically adjust in an inward direction, until it "finds" the fabric edge. The adjustment will terminate when the inside cell 165 is covered by the fabric edge, while the outside cell remains uncovered. If the fabric edge wanders in an outward direction, to cover both of the photocells, an outward adjustment of the tenter section will automatically follow, until the outer photoelectric cell 164 is again uncovered.

Still referring to FIGS. 6 and 7, the uncurled fabric edge, properly tracked by the sensing control 162, passes directly between a trimming roll 166, driven by a motor 170, and a pinch roller 167 cooperating therewith, whereby the fabric edge is positively advanced at a predetermined, controlled speed, typically somewhat greater than that of the tenter chains 105. The fabric is then advanced between a driven brush wheel 168 and cooperating, opposed plate 169. The brush wheel is disposed directly above the tenter chain 105 and has its bristles projecting slightly below the upper extremities of the tenter pins 108. The brush wheel 168 is driven at such a speed that its bristle extremities are traveling at a higher rate of speed than the tenter chain 105, enabling the fabric to be impaled upon the tips of the tenter pins 108 in a uniformly, desirably overfed condition.

The lightly pinned fabric then advances to a second non-driven brush wheel 171, the bristles 172 of which project substantially to the base ends of the tenter pins 108. The arrangement is such that, as the fabric passes under the brush wheel 171, it is pressed downward to a fully pinned condition. The idling speed of the brush wheel 171 is, of course, such that its bristles 172 are substantially synchronous with the tenter chain 105.

In accordance with one aspect of the invention, the draw rollers 157 are speed controlled relative to the speed of the tenter chains, by means of a so-called tach-follower control (not shown). The tach-follower control, which is available from commercial sources and by itself forms no part of this invention, drives the overfeed rollers 157 at a preset but adjustable percentage of the tenter chain speed. Typically, this is set to provide a predetermined percentage (e.g., 20–30% for some knitted fabrics) overfeed of the fabric to the tenter input. The overfeed trimming rolls 166 and brush wheels 168 at each side are in turn controlled by separately adjustable tach-follower controls related to the speed of the overfeed rolls 157. This enables a degree of separate overfeed control of the opposite fabric edges, for final cross line straightening as the fabric is applied to the tenter pins.

Advantageously, the overfeed rollers drive sets of conveyor tapes or belts 198, supported by idler rollers 199 (see FIG. 6). The belts support the center area of the fabric, as it is conveyed by the entry stage of the tenter, and prevent it from sagging excessively under its own weight, particularly when handling wet fabric.

In accordance with one of the more specific aspects of the invention, the edge-seeking entry end sections 160, 161 of the tenter sections are secured to the main tenter channels 150, 151 by means of special constant-length flexing sections 173, 174, details of which are illustrated in FIGS. 10–12. In this respect, it will be understood that the tenter chains 105, to be described in more detail, are intended to be flexible principally in the vertical plane, to accommodate travel about the reversing sheaves 109, 118, about the processing drum 39, and about various other sprockets and sheaves which are provided to guide and support the travel of the chain. While limited flexibility of the chain is provided to accommodate bending in horizontal directions, it is an objective of the invention to provide for horizontal flexure of the tenter chains in very gradual arcs and, in addition, to accommodate the flexure of the chains in unequal amounts in horizontal directions, without upsetting the desired synchronous relationship between a cooperating pair of tenter chains.

Referring specifically to FIGS. 10–12, the flexure section 174, which is a substantial duplicate of the opposite-side flexure section 173, is shown to comprise the pair of spaced, flexible side plates 175, 176, between which are positioned a plurality of flexible strips 177, 178, 179, and 179a. The several plates 175, 176 and strips 177–179 are separated from each other by suitable spacer means, such as washers 180, as shown in FIG. 12, and spacer plates 181, shown in FIG. 11. The spacer plates 181 are located at the end extremities of the flexure sections, while the spacing washers 180 may be provided at one or more intermediate locations. In between the spacers, the plates 175, 176 and the strips 177–179 are simply disposed in spaced apart relation, as is clearly reflected in FIG. 11.

As shown in FIG. 12, the proportions of the plates 175, 176, the strips 177–179a and the spacers 180, 181 are such as to form a member of channel-like cross section, in which the tenter chain 105 is received and guided. The channel section 151, shown in FIG. 12, receives the flexure section within its open side, such that the upper and lower channel arms 182, 183 form, with the flexure section 174, a pair of closed channels for the upper and lower reaches of the tenter chain. The upper reach of the chain is supported on the upper edges of the strips 177–179a, while the lower reach of the chain is supported on the lower channel arm 183. Likewise, the chain sections are confined laterally between the side plates 175, 176 of the flexure section, with the inner side plate 176 being received between the chain link bodies and the offset arm portions 107 extending therefrom.

In accordance with the invention, the several flexible strip sections 175–179a are slidably related to each other such that, notwithstanding the rather substantial width of the laminate-like assembly, it may be readily flexed over its length in a uniform, gradual bend. In addition, it is a feature of the invention that the flexure sections 173, 174 do not change significantly in effective length along the center line of the section, as formed by the central flexible strip 178. To this end, the flexure section 174 is secured to the tenter channel 151 by means of bolts 184 which extend completely through the flexure section and through the side wall of the channel section 151, as illustrated in FIG. 11. The bolts 184 are provided with enlarged bushing inserts 185 which extend through elongated openings 186 in the side plate 176 and the flexible strips 179, 179a. The elongated openings 186 are of a width (top-to-bottom) corresponding to the bushing 185, so that the elements 176, 179, 179a are accurately guided for relative movement in a lengthwise direction, while being fully supported in the vertical plane.

The central strip 178 of the assembly, along with the separating elements 181 on either side thereof, are bored to closely receive the body sections of the bolts 184, so that no relative movement between these elements and the bolts 184 is accommodated. The outer side plate 175 and the adjacent strip 177 are provided with elongated openings 187 similar to the openings 186, and these last mentioned elements are separated by a plate 181 which is provided with circular bores 188. Bushings 189 extend through the openings, 187, 188 and bear against the surface of one of the plates 181 adjacent the central strip 178.

As shown in FIG. 11, the bolts 184 extend through the side wall of the tenter channel 151 and are tightly engaged by nuts 190. In accordance with the invention, the length of the bushings 185, 189 is such as to enable the central flexible strip 178, together with the plates 181 immediately adjacent the strip on either side, to be tightly clamped in fixed relation to the tenter channel 151. The flexible strips 177, 179, 179a and the side plates 175, 176 are loosely accommodated by the fully tightened-down bolts, to provide for lengthwise relative movement of the loosely accommodated members, within the limits provided by the elongated slots 186, 187.

At the opposite ends of the flexure sections 173, 174, bolts 191 secure the laminate-like assembly to the entry section assemblies 160, 161, such that the center flexible strip 178 is rigidly related to the entry section, while the other flexible strips of the assembly are loosely accommodated for lengthwise relative movement.

At one or more locations intermediate the end extremities, depending on the overall length of the flexure assembly, bolts 192 may be provided. These bolts will extend from one side to the other of the flexure assembly, with end washers 193 being clamped tightly between an elongated bushing 194, such that the entire stack of flexible plates and strips, together with spacing washers 180, is loosely accommodated to provide for limited relative sliding movement between the bolts 192 and the flexible elements.

The arrangement of the flexure sections 173, 174 is such that the entry sections 160, 161 of the tenter sections may be flexed inwardly, relative to the principal longitudinal axis of the tenter channels 150, 151, by inward bending of the flexure sections. The flexure sections are of substantial length, relative to the width of the chain track (e.g., about two to six feet in length for a chain body of around one inch in width), so that the lateral bending of the chain track is very gradual. Thus, in a practical installation, using a heavy duty tenter chain capable of withstanding substantial tension forces and of being subjected to environmental extremes, the sections can easily be directed through a gradual bend of 10°, or so overall, which is suitable for most installations, or a much larger angle if desirable or expedient. A flexure of this angular extent, when related to the overall length of the flexure element plus the additional length of the entry sections 160, 161, provides for a substantial transverse movement of the entry end extremity of the tenter chain sections for edge-seeking purposes and to provide for a significant amount of widthwise distension of the fabric.

Of significance, substantial flexure of the sections 173, 174 is provided for without affecting the overall length of the tenter chain. In other words, by bending the flexure sections substantially along their respective center axes, the axis of the chain is neither lengthened nor shortened by movements of the sections 173, 174. This is desirable, because it frequently may be the case that one of the flexure sections may be bent to a much greater degree than the other, as if the fabric entering the tenter section is slightly off center of the longitudinal center line. In this respect, it will be understood that it is most desirable to establish and maintain a straight-across relationship of the stitch lines of the fabric, which may require complicated adjustment if the chains are caused or permitted to travel through different distances during the period in which the fabric is being conveyed.

Advantageously, provisions are made for limiting the angular extent of flexing of the sections 173, 174. This may be accomplished by means of a pair of limit switches 200, 201 carried by a guard plate assembly 202 on each of the tenter channels 150, 151. By means, such as an arm 203 carried by the tenter input sections 160, 161, the switches 200, 201 may be tripped at the inner and outer extremities of movement of the flexure sections 173, 174. Typically, the limit of outward flexure may be when the entry sections 160, 161 are aligned with the tenter channels 150, 151, inasmuch as edge-seeking outside of the main tenter path would be an abnormal circumstance. The limit of inward flexure may be set at about 10° of angle, or more, depending upon the needs of a particular installation.

Control of the inward and outward movement of the tenter input sections 160, 161 is effected by separate motors (not specifically shown) which drive screw shafts 204, 205 (FIG. 6) in one direction or the other, in response to the edge sensing of the photoelectric cells 164, 165, as previously described. However, should the edge sensing control tend to adjust one of the input sections beyond its limit switch conditions, the adjusting movement automatically will be terminated and typically a suitable signal will be provided to the operator. In addition, the limit switches 200, 201 advantageously are related through other contacts to the edge-seeking adjustment motors, such that, when the limit switches 200 or 201 are tripped during inward and outward adjusting movements of the tenter channels 150, 151, the entry sections 160, 161 automatically will follow along with the basic tenter width adjustment. In other words, inward width adjustment of the tenter channels 150, 151, in the condition shown in FIG. 6, would cause the switch 200 to be tripped by the actuating plate 203, and this would energize the edge-seeking adjustment for the entry section 160, enabling the entry section to follow along with the inward adjustment of the remainder of the tenter section.

Figure 8:
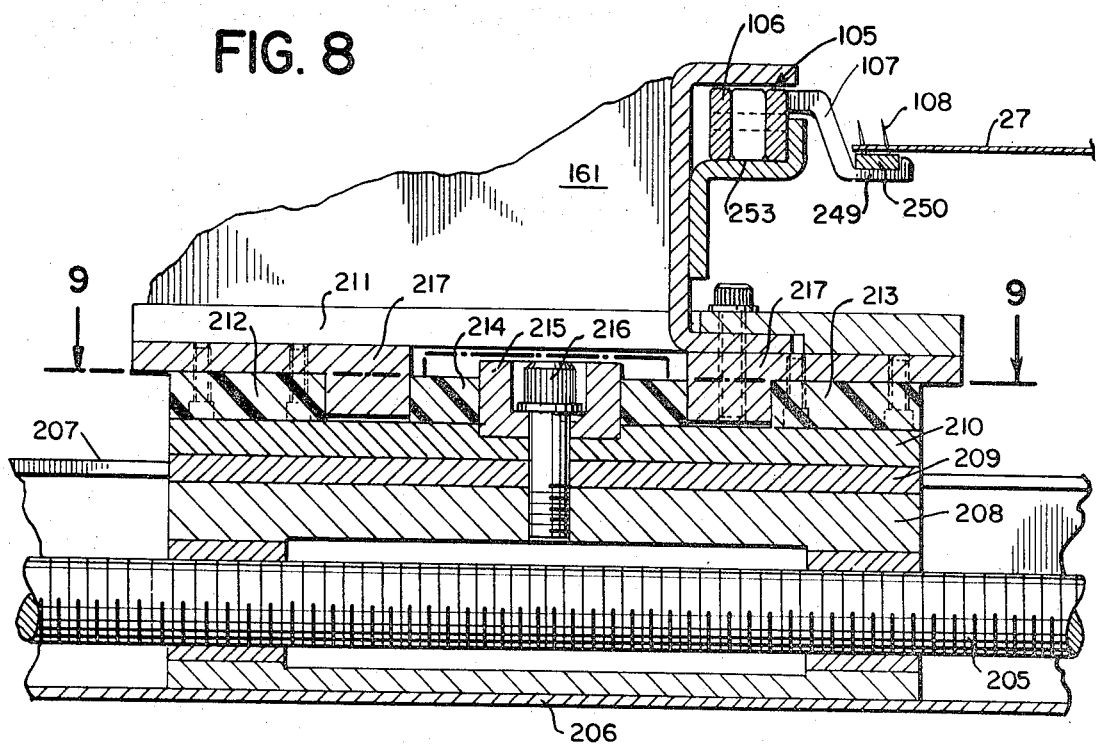
FIG. 8 is an enlarged fragmentary cross-sectional view taken generally along line 8—8 of FIG. 7.
Figure 9:
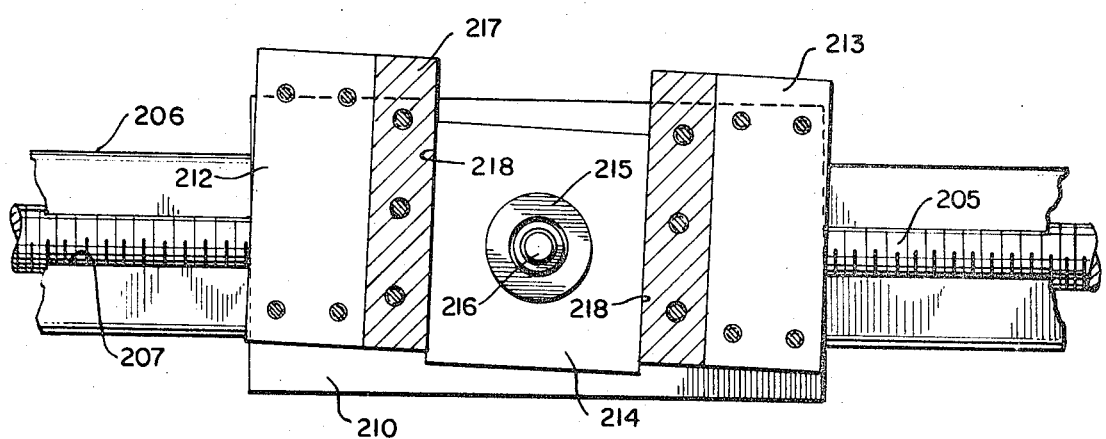
FIG. 9 is an enlarged fragmentary cross-sectional view taken generally along line 9—9 of FIG. 8.

As shown in FIGS. 8 and 9, the shafts 204, 205 (of which only shaft 205 is shown in FIGS. 8 and 9) for the edge-seeking adjustment mechanism are housed within a tubular element 206 which extends from one side of the apparatus to the other and is provided with a slot 207 in its upper wall. A slide block 208, threadedly engage with the shaft 205, is housed within the tubular element 206 and has a T-shaped assembly, consisting of a block 209 and a flat plate 210 secured thereto and exposed above the upper wall of the tubular element. A plate assembly 211, constituting a part of the tenter entry section 161, is slidably supported on the flat plate 210, through a pair of blocks 212, 213 formed of a suitable antifriction plastic material.

A pivot block 214, also advantageously formed of a low friction plastic material, is carried by the plate 210 for limited rotational movement about the axis of a large bushing 215 secured to the slide block 208 by a bolt 216. A pair of metal guide bars 217 are secured to the plate assembly 211 and bear against the longitudinal side edges 218 of the pivot block 214.

The arrangement of the mechanism illustrated in FIGS. 8 and 9 is such that, upon rotation of the threaded shaft 205 to advance the slide block 208 inward or outward, the plate assembly 211 may have relative longitudinal movement with respect to pivot block 214, and the latter may also pivot slightly, to accommodate the necessary flexing movements of the flexing sections 173, 174.

The discharge side tenter section 73 is comprised of a pair of elongated tenter guide channels 220 (see FIG. 15) which are supported at their inner ends by the carriages 132 and at their outer ends by a pair of carriages 221. Each of the carriages 221 includes a spaced pair of carriage wheels 222 resting on a relatively large diameter tubular supporting track 223. The track 223 is supported at its opposite ends by spaced stanchions 224.

As shown in FIGS. 15 and 16, the outer end portions of the tenter channels 220 are supported by short beam structures 225, to which the carriages 221 are attached. The beam structures 225 include a pair of spaced plates 226, which receive between them, at the outer end of the structures, tenter chain sprockets 227. The sprockets 227 for the spaced tenter chains advantageously are carried by a common sprocket shaft 228, which is supported by and extends between the spaced stanchions 224. By means of suitable journal blocks 229, slidably related to the shaft 228, the beams 225 and the sprockets 227 may be adjusted transversely with respect to the shaft 228, for effecing widthwise adjustment of the tenter chain.

In the illustrated arrangement, width adjustment of the discharge tenter section 73 is effected through adjustment of the carriages 132, within the dryer housing, and through operation of a threaded adjusting shaft 230, adjacent the outer end of the tenter section. The shaft 230, is, of course, suitably connected to the other adjusting shafts 120, 152 of the installation.

In order to keep the tenter chains 105 under proper tension, under all operating conditions, to compensate for wear and stretch of the chains (which may be unequal on opposite sides), each tenter chain system is provided with a pair of stationary and movable sheaves 231, 232. The stationary sheaves 231 are journaled by the beam structure 225, while the movable sheaves 232 are supported by pivot arms 233 carried by the shafts 234 of the sheaves 231. The movable sheaves 232 are acted upon by air cylinders 235, typically maintained under a constant pressure, such that the movable sheaves tend to be pivoted in a counterclockwise direction, as viewed in FIG. 15. The tenter chains 105 are trained, sinuously about the stationary and movable sheaves 231, 232 such that, when the air cylinders 235 are in an actuated condition, the chains are maintained in a constant, predetermined operating tension.

Above the discharge end of the tenter chains 105, there is advantageously provided a pair of full width pick-off rollers 236, 237 provided with fabric gripping surfaces and arranged to be driven through an adjustable tach-follower control at a speed referenced to that of the tenter chain. Typically, the rollers 236, 237 may be slightly separated, so that the fabric is not nipped in passing between them, but the configuration of the rollers is such that the fabric is caused to travel through a sinuous path in passing about the rollers, to provide for a substantial area of gripping contact with the roller surfaces. The pick-off rollers 236, 237 serve to draw the fabric upwardly off of the tenter pins, at the discharge end of the tenter chains and to cause the depinned fabric to be advanced toward the "batching" stage 42 at a readjusted speed to reflect changes in fabric geometry upon depinning. The illustrated batching stage is a folding stage, but may be a rolling or other batch collecting stage, as desired.

In accordance with one of the advantageous specific aspects of the invention, the pair of tenter chains 105 of the system is driven through a single power input to one chain only. More specifically, the tenter chain drive motor (not specifically illustrated) is connected to the shaft 228, which is slidably keyed to a first one of the tenter chain sprockets 227 while being rotatable relative to the other tenter chain. Accordingly, the tenter chain drive motor, when actuated, drives only one of the two tenter chains through a direct sprocket connection.

As will be understood, the single driven tenter chain, in traveling around the processing drum 39 within its annular guide channel 110 will rotate the drum in exact synchronism with the travel of the chain. In this respect, it will be understood that the frictional contact of the driven chain with its annular guide channel 110 extends over a sufficient length to establish a positive driving relationship between the chain and the processing drum.

In accordance with the invention, the second tenter chain, whose discharge end sprocket 227 is freely rotatable relative to the drive motor, is driven by the processing drum 39, through a frictional contacting relationship with the other annular guide channel 110. The described arrangement for driving of the spaced pair of tenter chains assures the most precise synchronism of chain travel throughout the system, particularly throughout the extent over which the chains are conveying the pinned fabric, and more particularly still, through the critical processing stage. If desired, provision can be made for disconnecting the first drive sprocket and keying the other to the shaft 228, so that the "driving" and "driven" chains may be alternated from time to time to equalize wear.

As will be understood, the tenter chains of a typically proportioned installation according to the invention are of quite substantial length overall. As a result, even though both chains of a pair contain exactly the same number of chain links and are driven by synchronously rotating sprockets, keyed to the same shaft, the actual linear travel of the chains may be somewhat different. In some cases, this can result from cumulative, non-compensating tolerance variations in the chain links themselves. In other cases, the variation may be a result of unequal cranges in the overall length of the chain caused by exposure to uneven temperatures or other conditions. Regardless of the cause, an unequal linear travel of two chains driven by synchronous sprockets and containing the same number of chain links can be expected in an installation of the size contemplated by the present invention and can result in undesirable angularity in the cross lines of the fabric.

In the system of the present invention, the tenter chains are synchronized according to the linear travel of the processing drum 39, rather than as a function of the number of teeth in a sprocket. This assures precise equality of linear travel of the chains, at least throughout the critical heat processing stage. In addition, the processing stage is located more or less in the middle of the fabric-conveying portion of the chain, which assures optimum synchronization of the linear travel of the chains throughout the fabric-carrying portions thereof not actually in contact with the processing drum.

Under appropriate circumstances, it may be feasible to impart the power input to the drum 39 itself, such that both tenter chains are driven by frictional contact with their respective tenter guide channels 110.

Referring now to FIGS. 17 and 18, there are shown details of an improved form of tenter chan link construction, adapted particularly for a tenter apparatus in which the chain is required to be deviated substantially in more than one plane. In the illustrated system, for example, the tenter chain is deviated significantly in the vertical planes, in passing around the various sprockets and sheaves and in passing around the processing drum 39. At the same time, it is required to be deviated, although to a lesser extent, in a horizontal plane, to accommodate the edge-seeking action of the entry end section of the tenter apparatus.

Each of the chain links 105 is of cast metal construction and has a body portion 240, from one end of which extends a single connecting leg 241 and from the opposite ends of which extends a pair of spaced connecting legs 242. The dimensional relationship of the single and double connecting legs 241, 242 is such, as reflected in FIG. 17, that the single leg 241 of one chain links is freely received between a pair of spaced legs 242 of the next link, with a slight lateral clearance.

In accordance with the invention, successive chain links are connected by means of split roll pins 244, of a type available from conventional commercial sources. The roll pins 244 are of a length to extend across the full width of the chain link, being fully received in a spaced pair of connecting legs 242, but preferably not extending laterally outward therefrom.

Advantageously, the transverse bore 245, extending through the spaced legs 242 for the reception of the roll pin 244, is of a size to form a tight frictional grip with the roll pin, placing the pin under compression by slightly closing its split 246. The bore 247 provided in the single connecting legs 241 is, on the other hand, advantageously of a size to accommodate relatively unrestricted rotationaly movement of the connecting leg 241 about the axis of the roll pin, which the pin remains immovable in the spaced connecting legs 242.

To provide for a predetermined amount of lateral flexibility in the tenter chain, the roll pins 244 are oriented in the spaced legs 242 with their split portions 246 lying in the plane containing the axes of both roll pins connecting that link to the adjacent links. With this arrangement, when successive links are substantially in the same plane, the split area 246 provides, in effect, a "flat" in the plane of the chain links, and this facilitates a degree of lateral deviation of one link relative to another in such plane.

The advantageous connecting arrangement for the tenter chain links is such as to provide an adequate degree of lateral flexibility of the chain, while at the same time keeping the chain substantially free of looseness in the lengthwise direction.

As indicated particularly in FIGS. 12 and 18, the chain link body 105 includes an integral extension arm 107, which extends downward and inward from the upper surface area 248 of the link body. At its lower extremity, the projecting arm 107 has an integral lateral extension 249 which seats a pin plate 250 carrying a plurality of upwardly and outwardly projecting tenter pins 108. Suitable tenter clips or the like may also be employed in place of pins, as will be understood.

As reflected in FIG. 12, the lateral extension 249 of the projecting arm 107 advantageously is disposed below the lower surface 253 of the chain link body. The desired arrangement is such that, when the chain links are received in the annular guide channels 110, disposed about the processing drum 39, the arm extensions 249 lie as close as practicable to the surface of the dryer drum. This enables the pinned fabric to be supported by the drum across the fullest extent of its overall width.

SUMMARY OF OPERATION

In the operation of the described system, it is advantageous to set the speed of the overall system by controllably adjusting the speed of the drive motor for the driven tenter chain, to thereby control the speed of operation of the heat processing stage, and to cause other functioning elements of the system to respond on a demand and/or tach-following basis. In this respect, it will be understood, that, in accordance with one aspect of the invention, power input is applied directly to only one of the pair of tenter chains. This directly driven chain serves to drive the processing drum 39, and the motion of the drum is utilized to drive the second tenter chain in precise linear synchronism with the first tenter chain.

At the input end of the tenter chains, the fabric edges are uncurled and "followed" by the described edge-seeking controls, so that the edge margin of the fabric is properly engaged by the tenter means. The edge-seeking function of the tenter chains is, of course, substantially independent of the operating speed of the line.

In order to provide a predetermined, controllable amount of overfeeding of the fabric onto the tenter pins, at the entry end of the tenter apparatus, to accommodate lateral distension of the fabric and shrinkage of the fabric in the processing stage, the supply of fabric to the tenters must be at a rate higher than the linear rate of travel of the tenter chains—as much as 20–30% higher in the case of some knitted fabrics, for example. To this end, the speed of rollers 156, 157, the rollers 166, 167, and also the brush wheels 168 advantageously are controlled by adjustable "tach-follower" controls, which enables these elements to be driven at a predetermined rate relative to the speed at which the tenter chains are driven. In other words, in order to achieve a basic overfeed rate of, say, 15%, the tach-follower control for the principal overfeed rollers 156, 157, can be set to operate at a speed which will correspond to 115% of the speed of the tenter chain drive, and this percentage relationship will be maintained, even though the operating speed of the tenter chains is adjusted to a different level.

The overfeed trimming rollers 166 and the related pinning brushes 168 are controlled by separately adjustable tach-follower controls for separate trimming motors 170 on each side. These separately controllable tach-followers follow the overfeed rollers 156, 157 and enable a slight "trimming" of the opposite edges of the fabric, one side relative to the other.

The tach-follower controls are conventionally available, and do not, in themselves, form part of the present invention. However, the context in which the controls are employed is of inventive significance.

Desirably, the input end of the tenter chain is fed on demand by the padding station 31, and the demand is reflected by the vertical position of a floating roller 37, which is, in effect, carried by a loop of the fabric. As this loop shortens, reflecting a reduction in the running "inventory" of the fabric between the padding station and the entry end of the tenter chains, the drive equipment for the padding stage automatically is increased in speed.

In a similar manner, a floating roller 29, measuring an inventory of fabric between the padding stage 31 and the slitting and opening stage 23, continuously adjusts the speed of the slitting stage.

At the supply source, a driven roller 22, arranged to draw fabric from a supply container 20, may be demand-controlled by a dancer roll 19.

On the discharge side of the processing stage, the folder or gathering stage 42 is speed controlled by the floating roller 45, and thus operates in response to the rate at which fabric is discharged at the de-pinning stage of the tenter.

Advantageously, the draw rollers 236, 237 at the de-pinning stage are operated by an adjustable tach-follower control which enables these rollers to be operated at controllable speeds slightly above or slightly below the tenter chain speed. Thus, if there is a readjustment in the chain geometry as the fabric is released from the tenter pins, such readjustment can be reflected by control of the draw roller speed relative to the tenter chain speed.

In a typical processing of a tubular knitted cotton fabric, for example, with the system of the invention, the tubular knitted fabric, typically in a non-uniformly wet form in its as-received condition from a previous wet processing operation, is drawn out of the supply container 20 and converted, in the slitting and opening stage 23, to a flat, open width form. The open width fabric is then conveyed to the padding stage 31, where the fabric may be impregnated with a processing solution, such as a "wash and wear" type resin. If no processing solution is used, the fabric still may be run through the padding stage and made uniformly wet, as in accordance with the copending Eugene Cohn et al., application Ser. No. 625,725, in order that a uniform heat processing action may be given to the fabric.

The uniformly wetted fabric from the padding stage is advanced to the entry end of the tenter, where the edges are uncurled, if necessary, and engaged by the tenter mechanism. The fabric edges are then advanced, usually, divergently, so that the fabric is laterally distended somewhat. Thereafter, the fabric is conveyed by the tenter chains at a predetermined, uniform width. During the initial portion of the tenter stage, prior to the entry of the fabric into the processor housing, the fabric is supported at several places between its edges by the conveyor tapes 198. This prevents the fabric, which at this point is still wet and heavy, from sagging and distorting. Inside the pre-heating chamber of the processor, the fabric is supported by low velocity air flows directed predominantly upward against the lower surface of the fabric.

After the fabric passes through the pre-heating chamber, it is applied to the surface of the processing drum 39 and conveyed through the main processing chamber. While traveling about the main chamber, the fabric is at all times engaged at its edges by the tenter chains and thus held at a precise, predetermined width, while being fully supported across its entire surface. Being thus supported, the fabric can be acted upon by very high velocity air jets, for highly efficient drying or other heat processing and for advantageous relaxation of the fabric. The fabric is then conveyed through a post-heating chamber 83, after which the fabric emerges from the processor housing 46.

Under some circumstances, the fabric may be directed, on a continuous tenter system, through a second processing stage, similar to the first, if additional processing capacity is necessary or desirable because of the nature of the fabric or the speed of operation of the line. In any event, after the last drying stage, the fabric advantageously is directed through a cooling stage 40, following which the fabric is de-pinned, geometrically re-adjusted if desired, and folded or otherwise gathered. In the heat setting of polyester fabrics, for example, it may be advantageous to effect a "shock cooling" of the fabric after heat processing. In such a case, the cooling stage may include a refrigeration capacity. Otherwise, cooling is effected by the circulation of unheated ambient air.

The design and construction of the rotary tenter-processor unit are of particular importance in that it is possible to achieve reliably uniform across-the-width processing results in a width-adjustable rotary processor of practical design. Thus, the apparatus of the invention utilizes a processor drum of fixed axial length, and provides full width air nozzles, both in conjunction with the use of symmetrically adjustable tenter guides. With this arrangement, the air flows in the critical heat processing area may be properly balanced and distributed in the first instance and thereafter are not altered or affected by adjustments in the width of the tenter facilities. In addition, symmetrical adjustment of the tenter guides, with reference to the center axis of the processor unit, not only maintains optimum balance in the air flows through the fabric, but also enables the fabric to retain its alignment with other components of an overall processing line.

Extremely efficient and uniform drying, heat setting, curing, or other heat processing is realized in the apparatus, partly because of the uniformly distributed high velocity air jets as above described, partly as a result of the distribution of air flows into and from the end chambers, blower intake chambers and exhaust outlets, and also partly as the result of providing an extremely narrow space between the drum surface and the surrounding air nozzles to achieve maximum effectiveness of the high velocity air jets. Overall, this arrangement enables an extraordinarily high processing capacity to be obtained in a unit of practical size.

The apparatus of the invention is particularly well adapted for, but not necessarily limited to, the processing of open width knitted fabric. In this respect, the tenter arrangements include advantageous facilities for aligning the cross lines of the fabric, overfeeding of the fabric onto the tenter chains to accommodate lengthwise shrinkage in the drying process, and facilities for laterally distending the fabric, prior to processing. All of these capabilities enable the delivered open width fabric to have an optimum geometric stability, and also to have a superior appearance as regards cross line straightness, etc.

In connection with the foregoing, it will be understood that the requirements of processing a knitted fabric are such that rotary tenter processors of available designs are not suitable or applicable to a sufficient extent to be commercially useful in the processing of knitted fabrics. On the other hand, the requirements for processing woven fabrics are sufficiently less rigorous that many of the principles of the present invention may be applied to commercial advantage in woven goods processing.

An advantageous feature of the system of the invention which appears to have broad applicability to the tenter handling of knitted fabrics, and perhaps also certain other types of fabrics, particularly those which are relatively unstable geometrically, is the provision of one or more narrow supporting tapes between the tenter chains. The supporting tapes extend parallel to the tenter axis, and typically are disposed substantially in the plane defined by the spaced tenter chains. Accordingly, when the fabric is gripped at its edges and conveyed by the tenter chains, the central areas of the fabric are supported against sagging.

More importantly, the supporting tapes associated with the tenter chains, are arranged to be driven at a speed which differs from the speed of the tenter chains themselves, typically, the tapes are driven at a slightly higher speed. This provides for an advantageous measure of cross line straightness control, which is particularly effective where a variable speed relationship is provided for between the supporting tapes and the tenter chains. Particularly where cross line control is important, as in the handling and processing of knitted and other distortable fabrics, it is significant that the arrangement of the supporting tapes be such as to support principally the central areas of the fabric, so that speed differentials between the supporting tapes and the tenter chains will have the effect of adjusting the center region of the fabric relative to its edges.

Various features of the invention, including but not limited to the tach-follower controls, combine to provide for an optimum control over the manipulation of the fabric throughout, to keep the fabric free of distortions and otherwise of a high finished quality. Among these features are the described arrangement for driving the tenter chains in linear synchronism, the constant-length flexing sections at the entry end of the tenter section, the separately adjustable overfeed trimming controls, and the like.

As will be observed, in the method and apparatus of the invention, the knitted or other fabric web being processed is contacted on one surface only. This is particularly desirable in the case of certain "sensitive" fabrics, such as cotton velours, for example, where it is very important to maintain one side substantially free of pressure contact with other surfaces throughout the processing operations.

In the system of the invention, where the fabrics to be processed initially is in tubular form, it may be desirable to apply a gumming composition to the fabric, so that a narrow margin of the composition extends along the short edges of the fabric, advantageously just outside the tenter pins. After processing, the gummed edges may be trimmed off, as by suitable slitters located in advance of the batching stage. It may also be advantageous to incorporate steaming stages in the processing line, so that the fabric may be steamed before and/or after heat processing, as may be desirable or expedient.

It should be understood, of course, that the specific form of the invention herein illustrated and described is intended to be representative only, as certain changes may be made therein without departing from the clear teachings of the disclosure. Accordingly, reference should be made to the following claims in determining the full scope of the invention.

What is claimed is:

1. A rotary tenter processor for fabric webs and the like, comprising
   (a) a processor housing,
   (b) a rotatable processing drum supported within the housing and having a perforate, cylindrical outer wall,
   (c) means to effect the flow of air generally radially through the perforate wall of the drum,
   (d) a pair of tenter chains arranged to travel about a substantial portion of the circumference of the drum, in synchronism therewith,
   (e) a circular chain guide for each of said tenter chains disposed about the perforate wall of said drum,
   (f) means on the drum supporting said chain guides for rotation with the drum,
   (g) each of said chain guides having a circular guide flange thereon, and
   (h) guide arms adjustably supported at a plurality of points radially outward of said drum,
   (i) said guide arms extending into contact relation with said guide flanges,
   (j) said guide arms being connected for axial adjustment in unison, to effect axial adjusting movement of said circular chain guides over said drum.

2. The processor of claim 1, wherein
   (a) said means to effect the flow of air generally radially to the drum includes air duct means closely embracing said drum about most of its circumference and across its full width,
   (b) said air duct means including a plurality of closely spaced, transversely disposed nozzles arranged to discharge discrete air streams at high velocity in a radial direction toward and through the perforate wall of said drum.

3. The processor of claim 2, further characterized by:
   (a) threaded adjusting rods disposed adjacent the surface of the drum,
   (b) said guide arms threadedly engaging said rods and extending radially inward therefrom into engagement with said guide flanges, and
   (c) means for rotating the adjusting rods in unison for effecting controlled narrowing or widening movements of said guide elements, and, hence, said chain guides.

4. A rotary tenter apparatus for processing fabrics of varying widths, which comprises:
   (a) a drum of fixed axial dimensions and having a perforate cylindrical wall,
   (b) means for effecting a flow of processing gas through said perforate wall,
   (c) a circular tenter chain guide adjacent each end of the drum,
   (d) said tenter chain guides having a limited plurality of support elements projecting into the interior of the drum and supported within the drum for axial adjusting movement.
   (e) each of said chain guides having a circular guide flange thereon,
   (f) guide arms adjustably supported at a plurality of points radially outward of said drum,
   (g) said guide arms extending into contacting relation with said guide flanges,
   (h) said guide arms being connected for axial adjustment in unison, to effect axial adjusting movement of said circular chain guides over said drum.

5. The rotary tenter apparatus of claim 4, further characterized by:
   (a) said circular chain guides being of channel-shaped cross section having spaced, radially outwardly projecting flanges,
   (b) said tenter chains being received in said channels and having portions extending over the axially inner flanges thereof for engagement with fabric supported by the drum,
   (c) said guide arms including pairs of roller elements positioned in straddling relation to the axially outer flanges of said channels.

6. A rotary tenter-processor for open width fabrics and the like, comprising
   (a) a processor housing,
   (b) a rotatable processing drum contained within the housing and having a fixed effective width,
   (c) tenter guide means supported adjacent each end of said drum and adjustable symmetrically in a direction parallel to the axis of the drum,
   (d) closely spaced air nozzles disposed about most of the circumference of the drum and extending transversely across the full effective width of the drum,
   (e) enlarged end chambers at each end of the drum for receiving air flowing axially from each end of the drum,
   (f) a pair of blowers for each of the end chambers,
   (g) a blower intake chamber at the front and back ends of each end chamber, each communicating with one of said blowers,
   (h) front and back plenum chambers embracing said processing drum and supplying air under pressure to said nozzles,
   (i) the front and back plenum chambers communicating respectively with the outlets of blowers receiving air from the front and rear intake chambers.

7. A rotary tenter-processor according to claim 6, further characterized by:
   (a) said housing having air outlet openings in the outer walls of said end chambers,
   (b) said outlet openings being generally axially aligned with the open ends of said drum to receive a portion of the air flowing axially from the ends of the drum.

8. A rotary tenter-processor according to claim 6, further characterized by:
   (a) said air nozzles being spaced from said processing drum a distance not significantly exceeding about two inches, for a drum on the order of seven feet in diameter,
   (b) said blowers, plenum chambers and nozzles being so related as to enable air to be discharged from said nozzles at a velocity of at least about 2,500 feet per minute.

9. A rotary tenter-processor according to claim 8, further characterized by:
   (a) said housing including pre-heating and post-heating chambers in advance of and in back of said processing drum,
   (b) said pre-heating and post-heating chambers including means to guide tenter chains at an adjustable predetermined width and having air nozzles above and below the plane of the fabric, and
   (c) means supplying air to the nozzles of said chambers to enable air to be discharged at a velocity significantly less than the velocity of the air issued from nozzles surrounding said drum.

10. A rotary tenter-processor according to claim 9, further characterized by:
    (a) at least one of said pre-heating and post-heating chambers having means for relatively proportioning the air flows from above and below the fabric, whereby to support the web of fabric across its width by a net upward flow of air.

11. A rotary tenter-processor according to claim 10, further characterized by:
   (a) said pre-heating and post-heating chambers being supplied with air under pressure from said front and back plenum chambers, respectively.

12. A processor according to claim 6, further characterized by:
   (a) an air heater unit being provided for each blower intake chamber,
   (b) said heater units being posiitoned generally within said enlarged end chambers and immediately adjacent the openings to the respective blower intake chambers.

13. A tenter-processor apparatus comprising:
   (a) a rotatable perforate processing drum of fixed length,
   (b) means to supply processing air to said drum, to flow radially thereinto, over a substantial portion of the circumference of the drum and across substantially its entire width,
   (c) tenter means supported by said drum and including annular tenter elements circumscribing the drum,
   (d) said annular tenter elements being adjustable axially of the drum,
   (e) means to support said annular elements in closely spaced relation to the surface of said drum comprising radially disposed elements projecting into the interior of the drum, and
   (f) supports within the drum, spaced well inward of its surface, engaging and movably supporting said radially disposed elements.

14. The tenter-processor apparatus of claim 13, further characterized by:
   (a) said annular tenter element comprising guide channel means for spaced tenter chains.

15. A tenter-processor system for open width fabrics and the like, comprising:
   (a) a rotable processing drum,
   (b) a pair of elongated tenter chains for engaging opposite edges of a fabric web and for guiding said web over and about said drum,
   (c) means for guiding said tenter chains about most of the circumference of said drum,
   (d) means establishing a direct driving and driven relationship between said tenter chains and said drum, said means including:
      (1) sprockets engaging said chains at their discharge ends,
      (2) a common shaft for said sprockets,
      (3) one of said sprockets being keyed to said shaft and the other being rotatable relative thereto, and
      (4) external drive means for driving said shaft and thereby said one chain,
   (e) said drum being driven by said one chain at a speed corresponding to the linear speed of the chain,
   (f) said drum engaging the second chain and driving said second chain at a lineal speed equal to the lineal speed of the first chain.

16. A rotary tenter apparatus for processing fabrics of varying widths, which comprises:
   (a) a drum of fixed axial dimensions having a perforate cylindrical wall,
   (b) means for effecting a flow of processing gas through said perforate wall,
   (c) a circular tenter chain guide adjacent each end of the drum,
   (d) said tenter chain guides having a limited plurality of support elements projecting into the interior of the drum and supported within the drum for axial adjusting movement,
   (e) means on the drum supporting said chain guides for rotation with the drum, and
   (f) fabric width control means, disposed radially outward of the drum and engaging said chain guides, for adjusting the chain guides axially with respect to the perforate wall of the drum.

17. The apparatus of claim 16, further including
   (a) air duct means closely embracing said drum about most of its circumference and across its full width,
   (b) said duct means including a plurality of closely spaced, transversely disposed nozzles arranged to discharge discrete air streams at high velocity in a radial direction toward and through the perforate wall of said drum.

18. A tenter-processor system for open width fabrics and the like, comprising:
   (a) a rotatable processing drum,
   (b) first and second elongated tenter chains for engaging opposite edges of a fabric web and for guiding said web over and about said drum,
   (c) means for guiding said first and second tenter chains about most of the circumference of said drum, and
   (d) external drive means for rotating said drum and advancing said first and second tenter chains,
   (e) said drive means operatively engaging and driving only said first tenter chain at a predetermined linear speed,
   (f) said first tenter chain rotatably driving said drum at a speed corresponding to said predetermined linear speed through frictional contact therewith,
   (g) said second tenter chain being driven at said predetermined linear speed by frictional engagement with said drum,
   (h) whereby all portions of said web are guided over and about said drum at said predetermined linear speed.

19. A rotary tenter processor comprising
   (a) a processor housing,
   (b) a rotatable processing drum having a fixed predetermined width supported within said housing,
   (c) said processing drum having a perforate cylindrical outer wall
   (d) air supply means to effect the flow of air generally radially through the perforate wall of the drum,
   (e) said air supply means including an air duct closely embracing the perforate outer wall of said processing drum,
   (f) said air duct having a plurality of nozzle openings extending the full width of said drum for discharging discrete high velocity streams of drying air in a generally radially inward direction toward the perforate outer surface of said drum,
   (g) fabric conveying means for engaging and directing a fabric over said processor drum,
   (h) said fabric conveying means including a pair of tenter chains arranged to travel about a substantial portion of the circumference of the drum in synchronism therewith, and
   (i) adjusting means for varying the distance between said tenter chains by moving both of said tenter chains relative to said drum surface to accommodate various fabric widths,
   (j) said adjusting means maintaining said tenter chains spaced generally symmetrically about the center of said processing drum.

20. The rotary tenter processor of claim 19, wherein:
   (a) said air supply means includes blower means to effect air discharge velocities of at least about 2500 feet per minute through said nozzle openings and toward said processor drum.

21. The rotary tenter processor of claim 19, wherein:
   (a) said processor drum has a diameter on the order of approximately 7 feet, and
   (b) said nozzle openings are spaced approximately 2 inches from the outer perforate surface of said processor drum.

(References on following page)

References Cited

UNITED STATES PATENTS

| | | | |
|---|---|---|---|
| 1,963,672 | 6/1934 | Parkes | 26—59 |
| 2,252,181 | 8/1941 | Hunter et al. | 34—122 |
| 2,831,234 | 4/1958 | Vits | 26—57(A) |
| 3,065,551 | 11/1962 | Cohn et al. | 34—62 |
| 3,102,006 | 8/1963 | Cohn et al. | 34—23 |
| 3,150,432 | 9/1964 | McCreary | 26—57(E) |
| 3,235,931 | 2/1966 | Bruckner | 26—60(X) |
| 3,327,367 | 6/1967 | Dungler | 26—60 |

FOREIGN PATENTS

| | | | |
|---|---|---|---|
| 752,075 | 7/1933 | France | 26—61(A) |

ROBERT R. MACKEY, Primary Examiner

U.S. Cl. X.R.

26—51.3, 57, 60, 61; 34—112, 122, 158